Feb. 27, 1945.   A. H. VAUGHAN   2,370,381
APPARATUS FOR HANDLING AND HEAT TREATING GLASS
Filed April 19, 1940   11 Sheets-Sheet 8
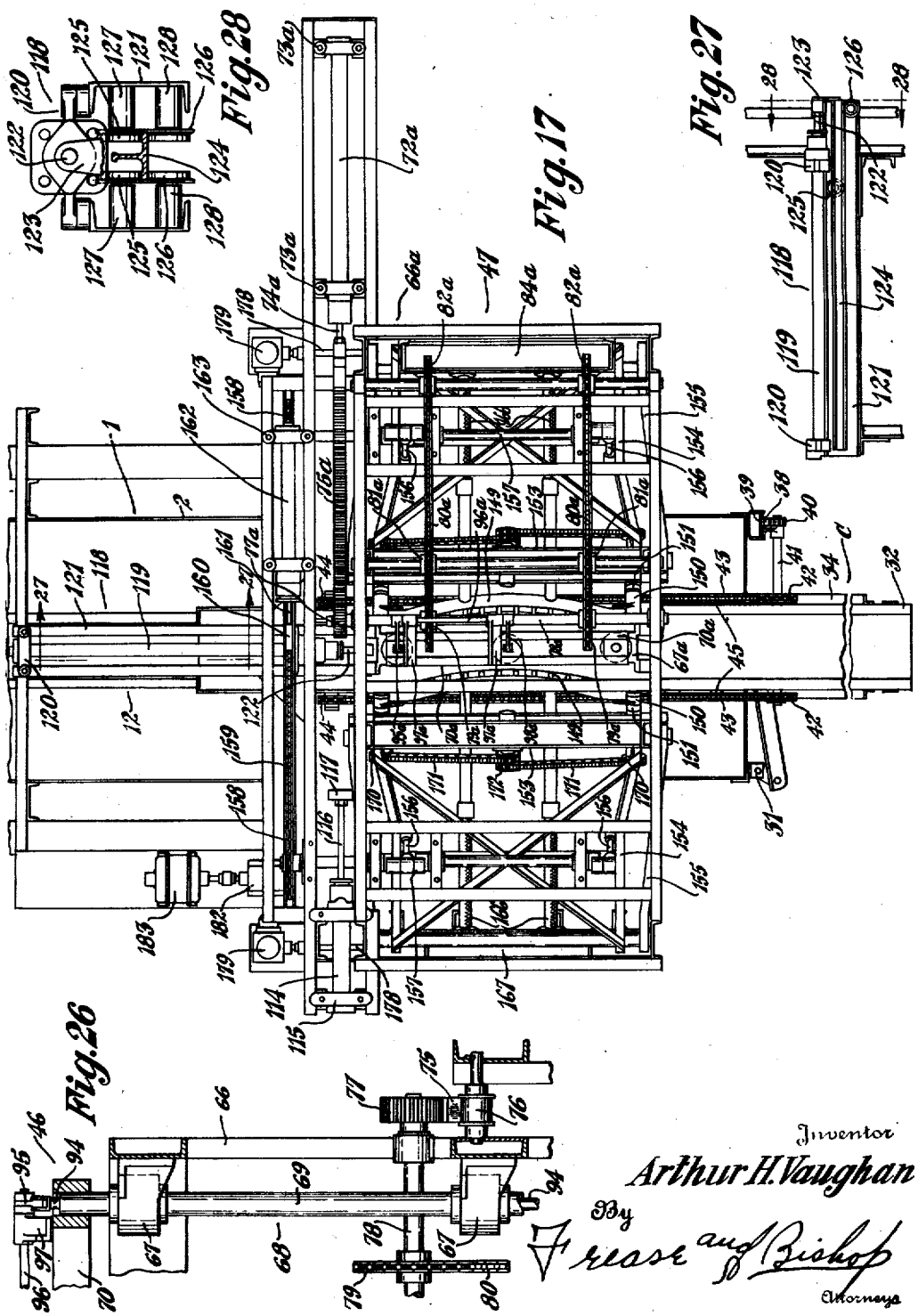
Inventor
Arthur H. Vaughan
By
Frease and Bishop
Attorneys

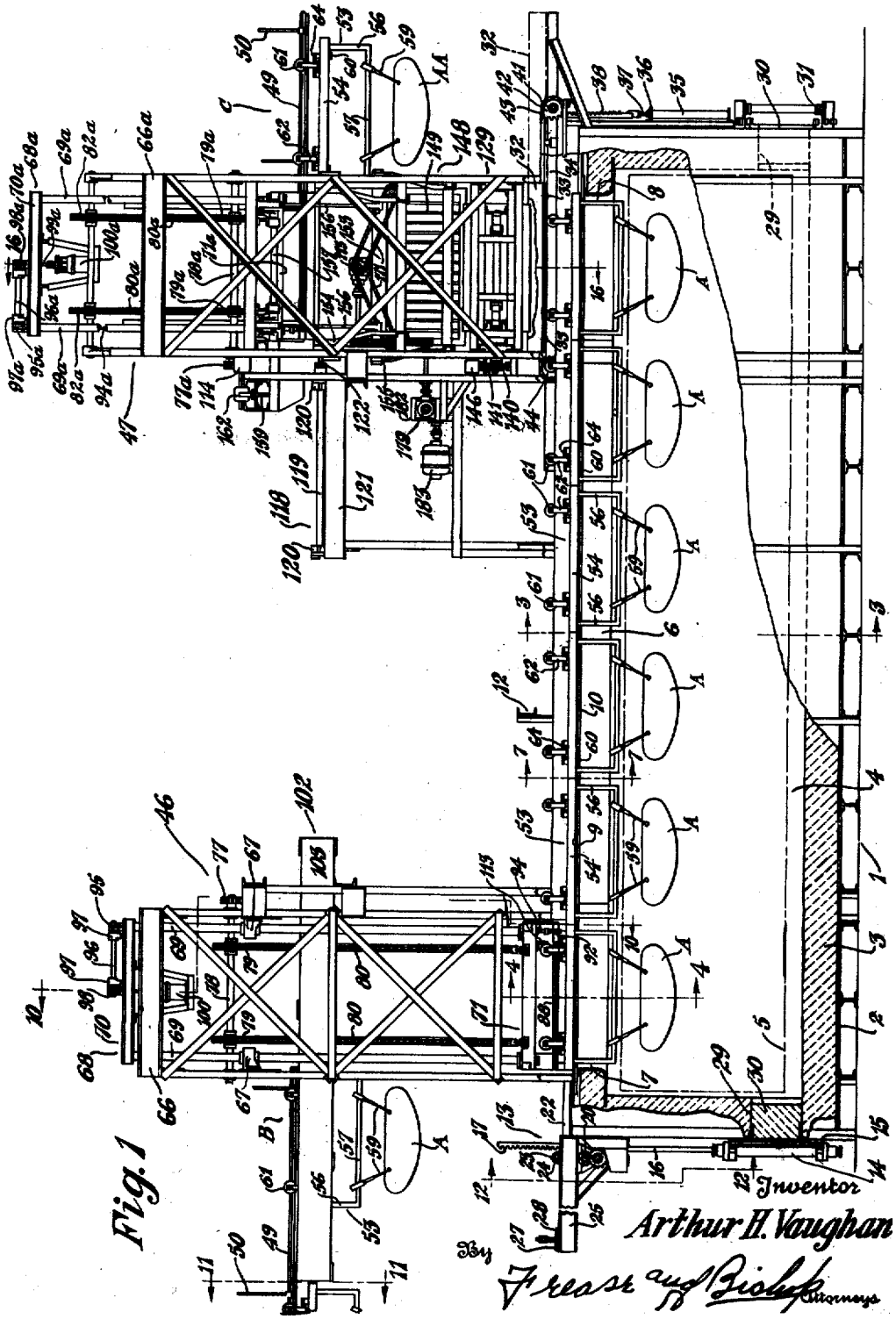

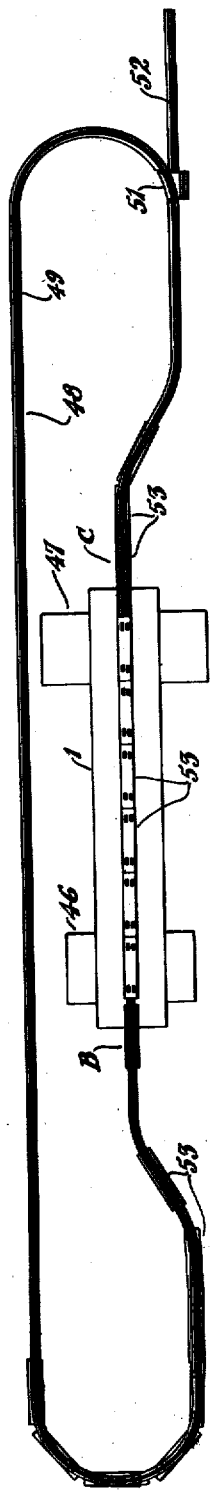
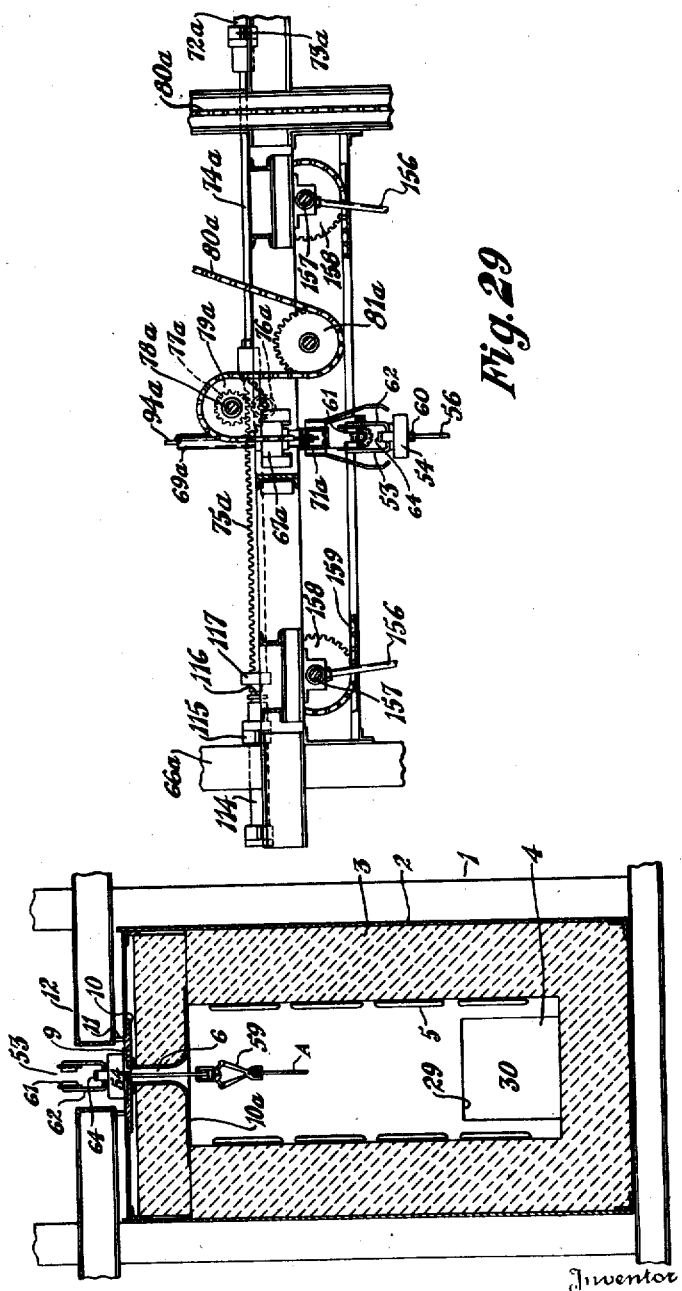

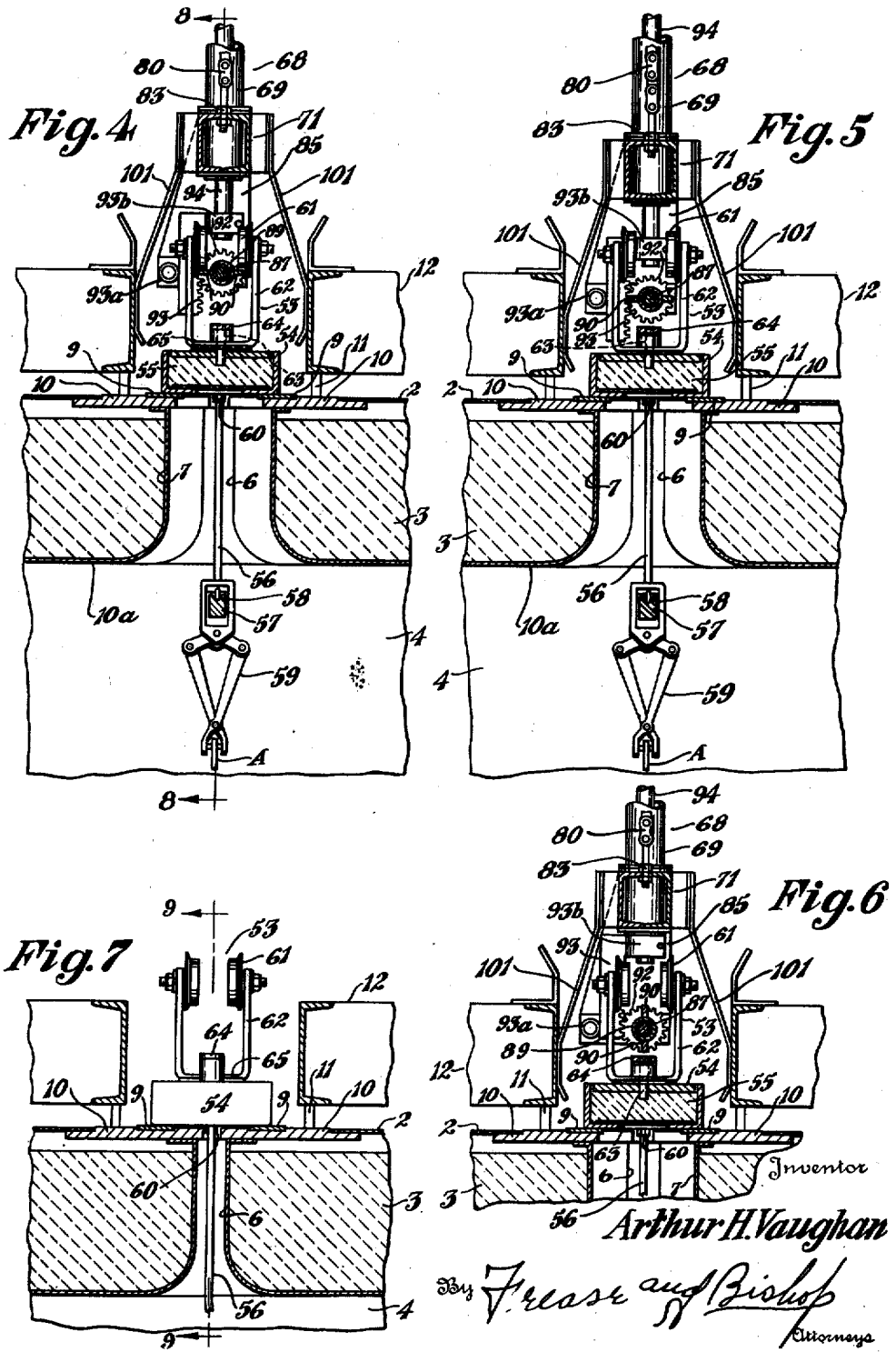

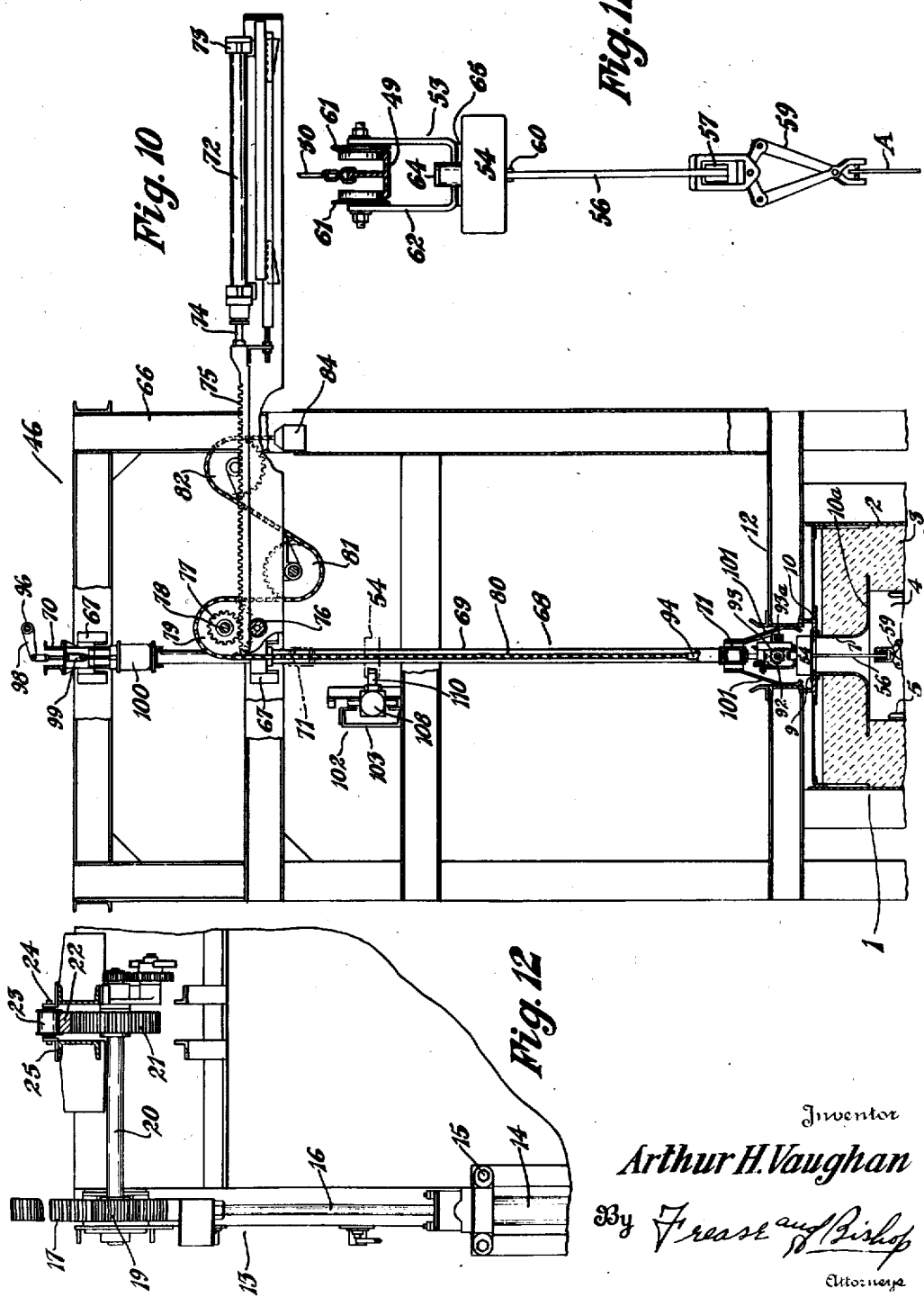

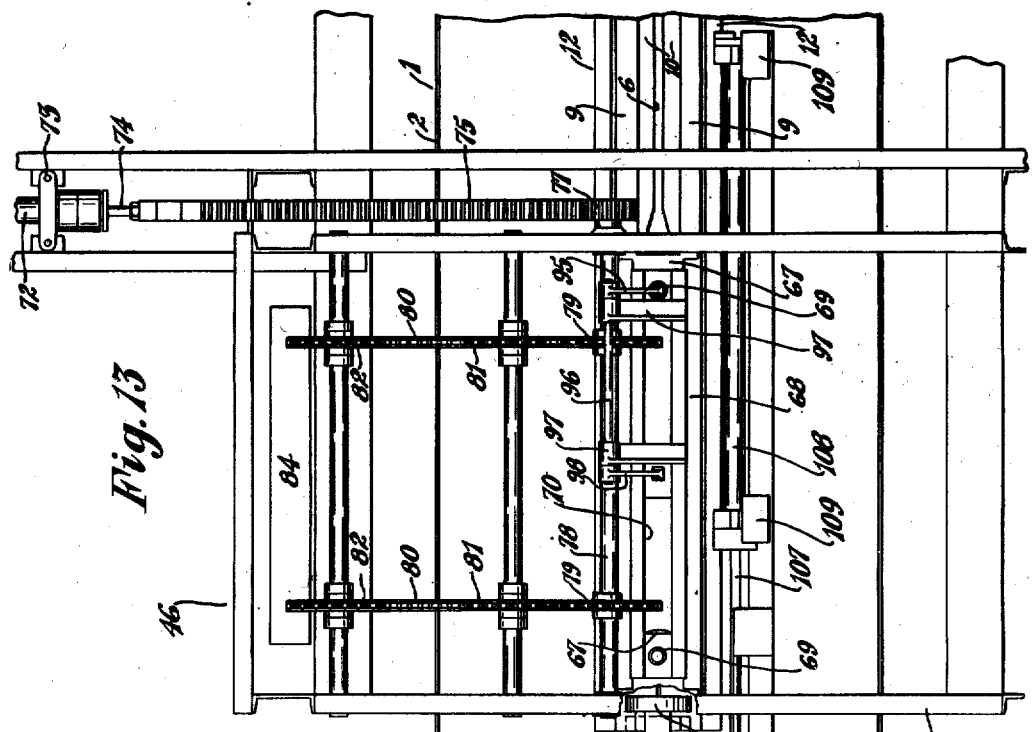
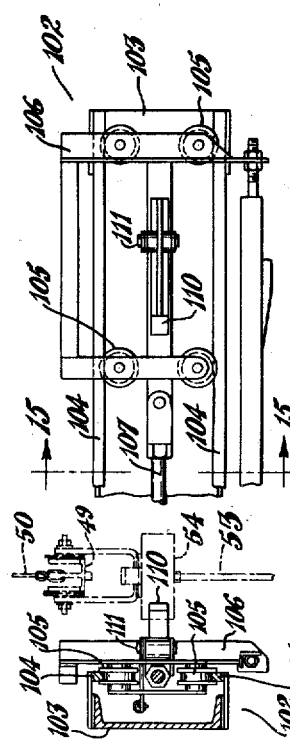
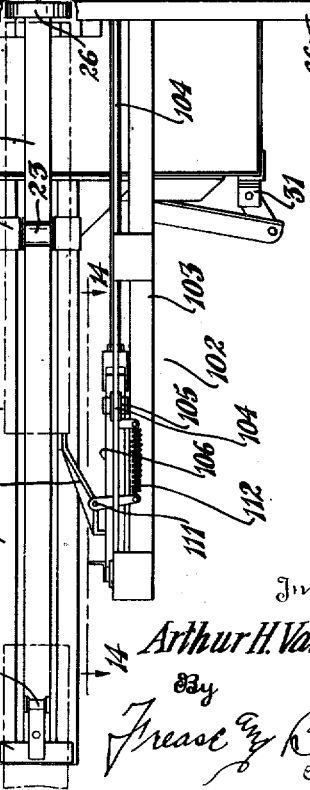

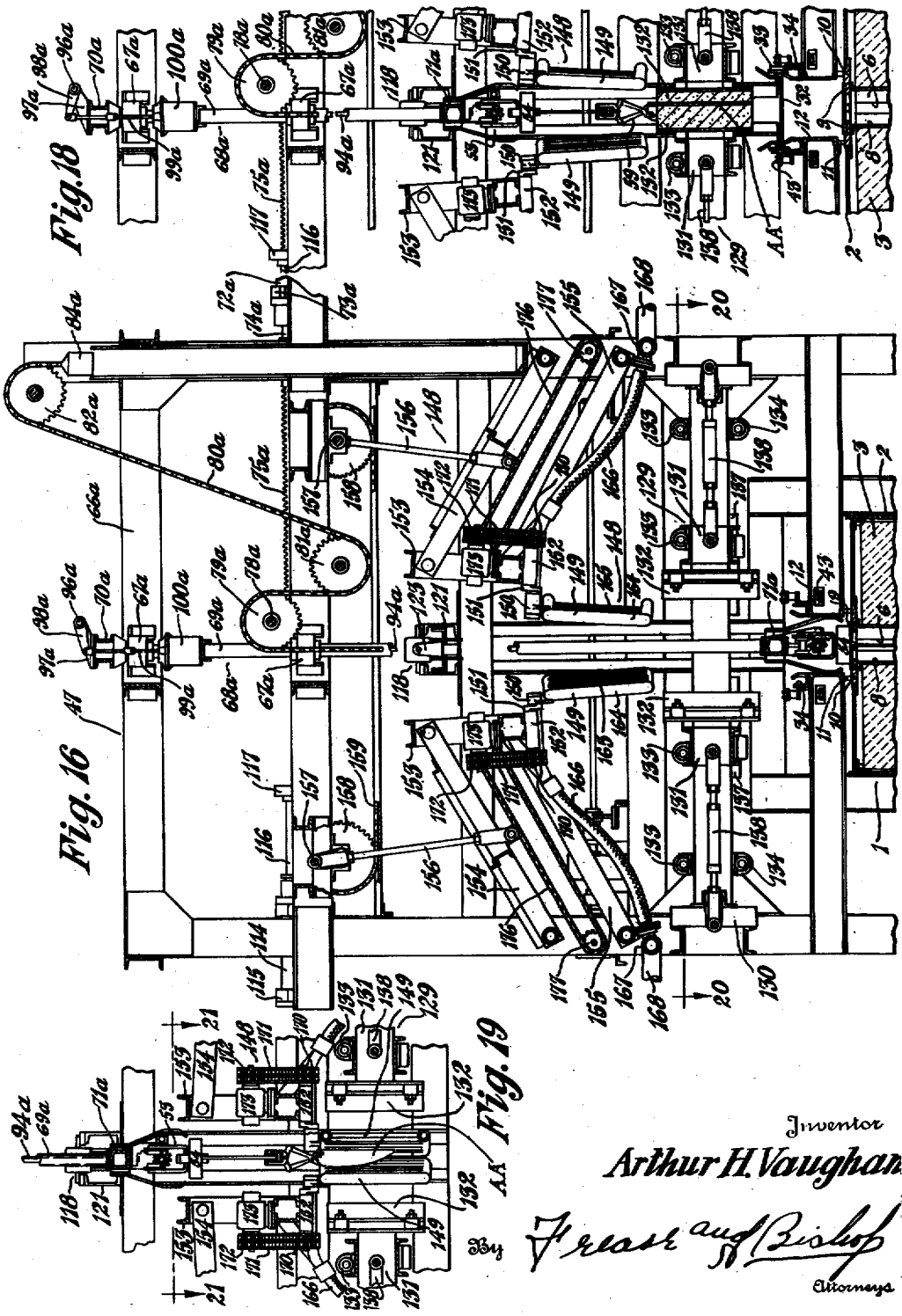

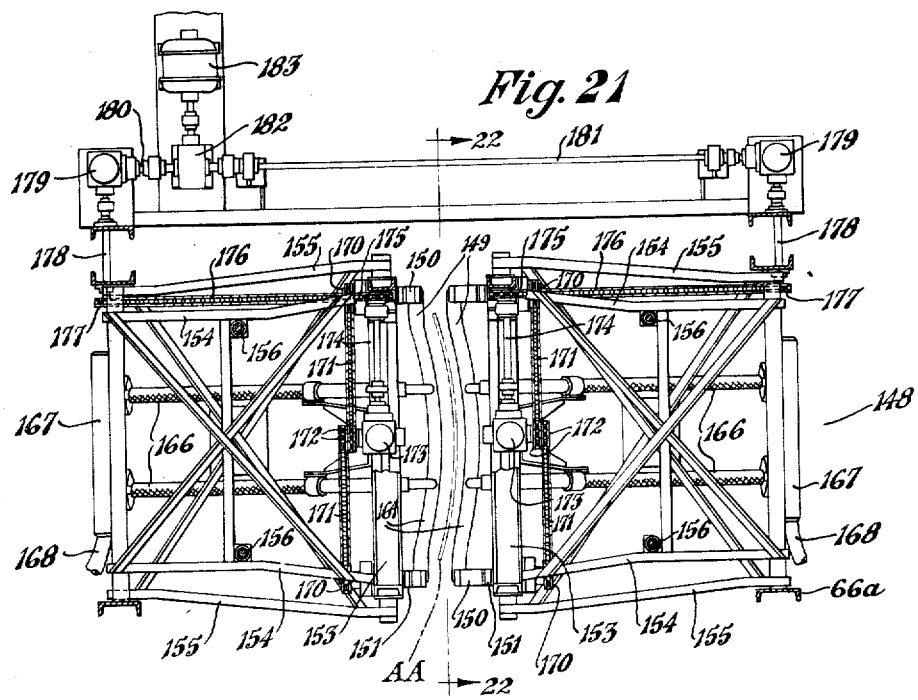
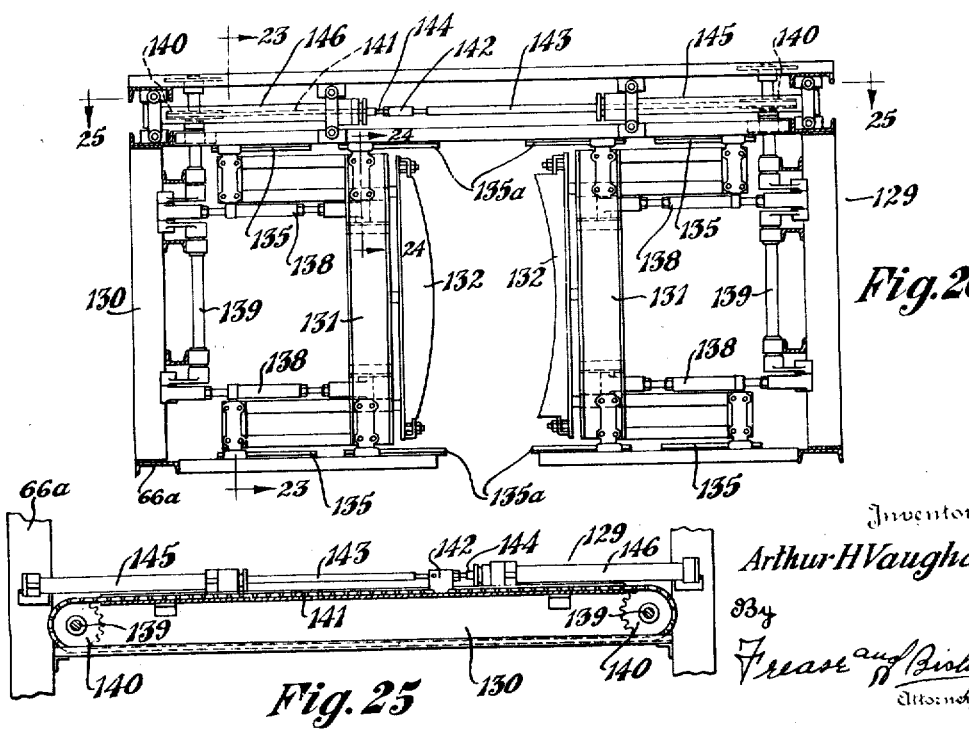

Inventor
Arthur H. Vaughan
By Frease and Bishop
Attorneys

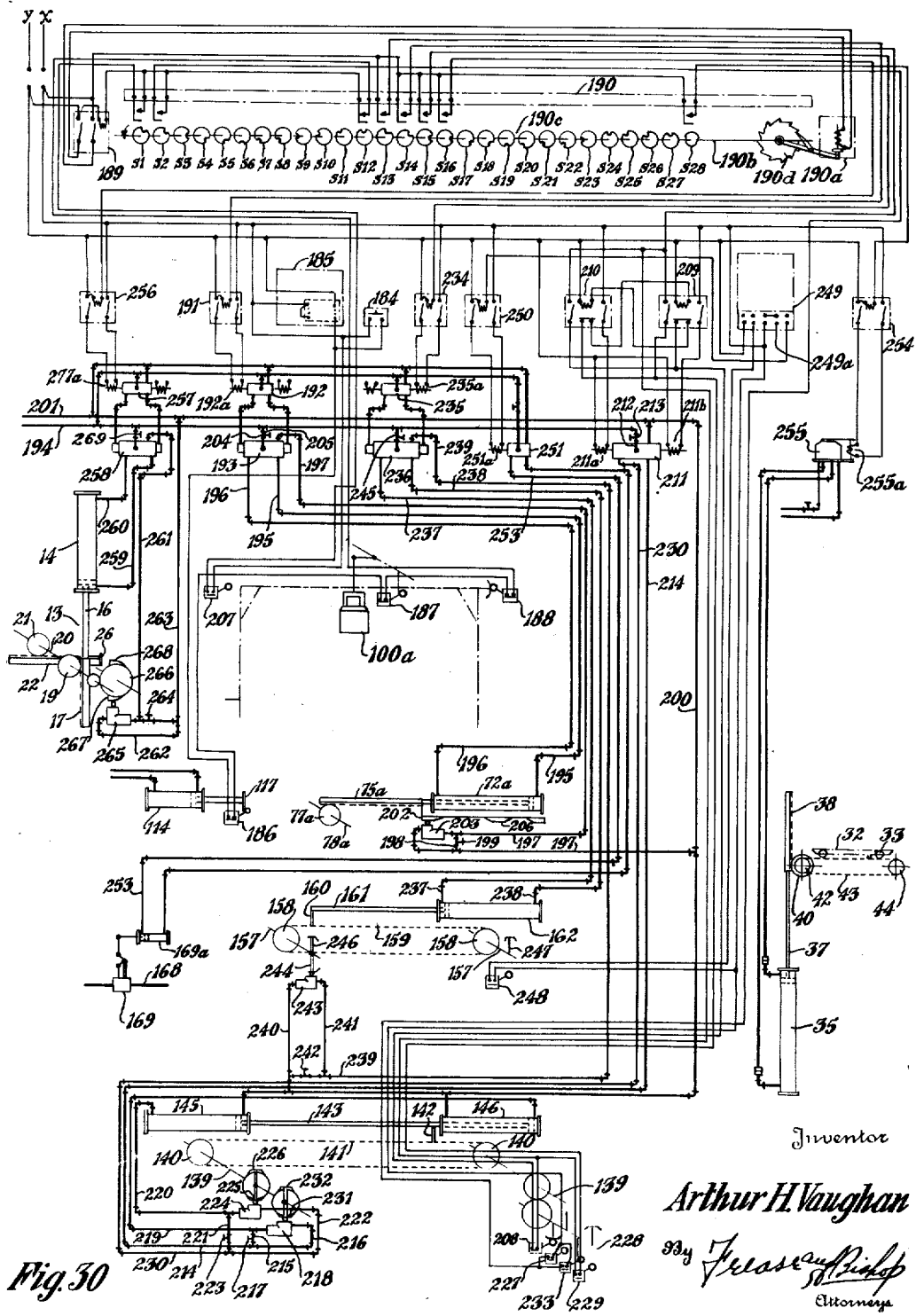

Patented Feb. 27, 1945

2,370,381

UNITED STATES PATENT OFFICE 2,370,381

APPARATUS FOR HANDLING AND HEAT-TREATING GLASS

Arthur H. Vaughan, Salem, Ohio, assignor to The Electric Furnace Company, Salem, Ohio, a corporation of Ohio Application April 19, 1940, Serial No. 330,536

33 Claims. (Cl. 49—1)

The invention relates generally to furnaces for heat treating glass, such as polished plate glass, and to handling equipment associated with such furnaces for the continuous production of heat treated glass.

More particularly, the invention relates to glass handling and heat treating apparatus for producing curved or "bent" heat treated glass. However, the invention is not limited to the production of bent heat treated glass, because the apparatus may be used, by omitting certain operations, for the production of flat heat treated glass.

A furnace having an elongated heating chamber and having a longitudinal slot in its upper wall or roof is ordinarily used for heat treating glass. "Lights" of glass, i. e., pieces cut to the desired size and shape, are suspended in a vertical position within the furnace chamber from suitable carrier means. The carriers usually include an external carrier member, one or more suspension rods adapted to extend through the furnace slot, and a support bar positioned within the furnace chamber below the roof. The lights are ordinarily suspended within the furnace chamber by gripping tongs which hang from the support bar.

The lights, suspended by the carriers as described, are usually introduced into the furnace chamber at one end thereof through a first opening, either in the furnace end wall or roof; and are removed from the furnace chamber at the other end thereof through a similar second opening. The carriers are advanced step by step from the first opening to the second opening at intervals so that the lights are uniformly heated, by suitable heating means within the furnace chamber, to a temperature at which the glass is plastic, usually about 1150° F. to 1200° F. Immediately after removing the lights from the furnace, each surface of the glass is rapidly chilled or cooled to below the softening temperature thereof by subjecting said surfaces for the necessary time interval to the chilling action of a plurality of air blasts or jets. Thereafter, the lights are usually cooled more slowly to room temperature, which completes the heat treating cycle.

Heat treated glass made in this manner is in a state of stress such as to impart certain desirable properties to the glass, including high resistance to fracture. A heat treating and tempering furnace for making heat treated flat glass in the general manner described, is shown in U. S. Patent No. 2,170,749.

It has been discovered that glass lights may be bent, curved or shaped by suitable bending molds from an initial flat shape to a desired bent shape, if the bending is performed during the heat treatment thereof before the air blast step and while the lights are in a suitable condition of plasticity resulting from heating.

On the other hand, it has been found that improperly heat treated glass is produced, and that breakage frequently occurs during the blast step, if more than a few seconds elapse between the time of removal of the glass from the heating furnace and the commencement of the blast step. Therefore, any bending operation must be completed very rapidly, within a period of only a few seconds, while the glass retains its softness, and without substantially cooling the glass prior to the blast step.

Heat treated glass, whether bent or flat, has many uses, such as in the construction of automobiles. It is therefore desirable, if possible, to manufacture heat treated glass in continuous production so as to reduce the cost thereof.

Accordingly, it is quite important to use very rapidly operating conveying or handling equipment in the production of heat treated glass. That is to say, the operations of manipulating carriers to place lights in and remove them from the furnace, of bending the lights (if used), of applying the air blasts to the lights, and of removing carriers from the blast position, should be performed in the least possible time so that a maximum number of carriers may be handled per hour.

It is also important in the production of heat treated glass to use equipment capable of smooth and gentle operation, because the material handled is glass, and because at times the glass is in a plastic state.

Glass handling tongs and carriers have previously been designed for avoiding certain difficulties in handling glass during the heat treatment thereof; and it is therefore important that any furnace and handling equipment used for the continuous production of heat treated glass must be adapted for using such known typical designs of tongs and carriers.

Moreover, temperature disturbances in a glass heat treating furnace must be avoided, so that it is important to have only a minimum exposure of the furnace entrance and discharge openings, and to locate such openings in the furnace roof.

And finally, it is important, if not necessary, in the production of bent heat treated glass, to perform the bending operation at the same place or station that the air blast operation is performed so that a proper, fast, air-blast cooling may be carried out quickly after removing the glass from the heating furnace.

The construction of a furnace and handling equipment for the continuous production of heat treated glass, either bent or flat, satisfying the necessary and important conditions stated immediately above, therefore presents a number of problems, the most important of which may be stated as follows:

A. To make substantially continuous and automatic glass handling and treating apparatus for rapidly handling glass safely in a vertical position with typical carriers and tongs to carry out a known heat treating cycle including a heating of the glass in a vertical furnace and a chilling thereof within a very few seconds after removal from the furnace.

B. To make mechanism that will quickly bend or mold glass lights at a bending and blast station and leave the station unobstructed for carrying out a succeeding air blast operation at said station within a very few seconds after removal of the lights from the heating furnace.

C. To make mechanism for quickly moving blast head apparatus to and from, and for positioning the same at, a bending and blast station alternately occupied by bending molds.

D. To make an elevator construction, either loading or unloading, for the quick and safe transfer of glass in a vertical position between a furnace, certain treating stations, and an external conveyor.

E. To make mechanism for moving molds and blast heads to and from a bending and blast station located within the confines of an elevator structure and immediately above the furnace discharge opening; and for stopping such elevator exactly at said bending and blast station.

F. To collectively solve the above problems, because each raises obstacles with respect to others due to the temperature, time and location limitations involved in carrying out the heat treating cycle, and due to the character, condition and arrangement of the material being treated.

Accordingly, it is an object of the invention to provide apparatus for substantially automatically continuously handling and heat treating glass.

It is also an object of the invention to provide apparatus for substantially automatically continuously handling and heat treating glass in a vertically opening furnace with a minimum exposure of and heat loss from the furnace openings.

It is also an object of the invention to provide apparatus for substantially automatically continuously handling and heat treating vertically suspended glass lights.

It is also an object of the invention to provide apparatus for substantially automatically continuously handling and heat treating glass suspended from typical carriers by typical tongs.

It is also an object of the present invention to provide rapid, smooth and gentle operating glass handling and heat treating apparatus.

It is also a general object of the invention to provide glass handling and heat treating apparatus, the operation of which avoids complicated and interrelated difficulties arising, because of the character, condition and arrangement of the material being treated, and because of the temperature, time and location of the various steps of treatment.

It is also an object of the invention to provide glass handling and heat treating apparatus for carrying out several operations of a heat treating cycle at one time, and with a minimum elapsed time per operation, so that maximum production from the apparatus may be obtained.

Likewise, it is an object of the invention to provide an elevator construction that can quickly transfer carriers from and to an external conveyor, vertical openings in a furnace, and an intermediate position between the furnace exit opening and conveyor, without jarring, dropping or mishandling glass lights suspended by the carriers.

It is also an object of the invention to provide an elevator construction for quickly vertically moving glass carried in a vertical position, either up or down, without jarring, dropping, breaking or injuring the glass.

It is also an object of the invention to provide an elevator without guides in the path of movement of the elevator car so as to permit the use of the space through which the elevator car travels, as a work space.

It is also an object of the invention to provide guides for an elevator car without interfering with the use of bending and air blast equipment at a bending and blast station located at a position intermediate the limits of travel of the elevator car.

It is also an object of the invention to provide an elevator car with rotary means for engaging and disengaging a carrier.

It is also an object of the invention to provide an engaging and disengaging elevator car for picking up and releasing a wheeled carrier.

It is also an object of the invention to provide an operating mechanism for elevator car engaging and disengaging means, carried by the car and extending through a guide for the car.

It is also an object of the invention to provide a charging elevator construction, which may move a wheeled carrier to a lowered position for entering a light into a furnace, and immediately release the carrier so that the elevator may be loaded with another carrier and ready for another light insertion into the furnace as soon as the furnace pusher retracts from advancing lights through the furnace; so as to avoid a long exposure of the furnace charging opening, or a covering of the same, while loading the elevator, if the elevator stayed down until the furnace pusher moved the carrier off of the elevator, and so as to speed up the operation of glass handling equipment, of which the charging elevator is a part.

It is also an object of the invention to provide a loading mechanism for transferring a wheeled carrier from an external conveyor to a charging elevator having the described characteristics.

It is also an object of the invention to provide a discharge elevator with a positive stop for accurately locating the elevator car at a fixed position intermediate its limits of movement.

It is also an object of the invention to provide a discharge elevator construction which may remove a wheeled carrier vertically from a position directly under the elevator immediately upon lowering the elevator car; so that the car does not have to be in lowered position while a carrier is being moved under the elevator, which would prevent use of the car, or the carrying out of operations within the confines of the elevator shaft, while the carrier is being moved to a position below the car, and so as to speed up the operation of glass handling equipment, of which the discharge elevator is a part.

It is also an object of the invention to provide an unloading mechanism for transferring a wheeled carrier from a discharge elevator having the described characteristics to an external conveyor.

It is also an object of the invention to provide bending mold operating mechanism which can bend or mold glass suspended from a carrier.

It is also an object of the invention to provide bending mold operating mechanism, which combines extremely rapid completion of the bending operation and sufficiently slow deformation of the glass being bent, and which will subject the glass to a minimum of chilling due to contact with the molds.

It is also an object of the invention to provide fluid pressure actuated rotary glass bending mold operating mechanism for glass bending molds.

It is also an object of the invention to provide bending mold operating mechanism which can move the molds to a bending position, perform a bending operation, and move the molds to a retracted position within about two seconds.

It is also an object of the invention to provide bending mold operating mechanism, certain parts of which move through 360 degrees in performing a bending operation.

Likewise, it is an object of the invention to provide bending mold operating mechanism with speed control means for preventing jarring or breakage of glass being bent.

It is also an object of the invention to provide glass bending mold operating mechanism in which the limits of movement of the molds may be accurately adjusted.

It is also an object of the invention to provide movable rotary blast head mounting means for quickly and accurately moving blast heads to and from a blast station.

It is also an object of the invention to provide a substantially parallelogram linkage for movably mounting a rotary blast head.

It is also an object of the invention to provide a movable rotary air blast head with means for operating a valve for the blast air coordinated with the movement of the blast head to a predetermined position.

It is also an object of the invention to provide a bending mold and blast head mounting and operating construction for performing alternate molding and blasting operations upon glass positioned at one station.

It is also an object of the invention to provide a construction in which a discharge elevator car, bending molds, and blast heads may be quickly moved to and accurately located at a bending and blast station intermediate the limits of the elevator car travel, and within the path of movement thereof, to perform a bending operation and then a blasting operation on glass lights carried by the elevator car.

It is also an object of the invention to provide a discharge elevator, bending mold and blast head construction, and operating mechanism therefor, for carrying out a bending and a blasting operation immediately above the exit opening of a vertically opening glass heat treating furnace.

It is also an object of the invention to provide hydraulic operating mechanism for elevators, bending molds, blast heads, furnace pusher means, elevator loader and unloader means, air blast valve means, and elevator car engaging and disengaging means, forming constituent parts of substantially automatically continuous glass handling and heat treating apparatus.

It is also an object of the invention to provide electrical actuating and control mechanism for the said hydraulic operating mechanism.

It is also an object of the invention to provide sequence and safety control means for the said electrical actuating mechanism, and the said hydraulic operating mechanism, for substantially automatically and continuously operating glass handling and heat treating apparatus.

It is also an object of the invention to provide said hydraulic operating mechanism with hydraulic cylinders and with speed control means for starting and stopping the pistons moving in said cylinders, and the devices moved thereby, so as to avoid jarring and breaking glass lights being handled.

It is also an object of the invention to provide cullet pan means for protecting a furnace discharge opening at all times except when a discharge elevator is removing a carrier from the furnace.

It is also an object of the invention to provide an external conveyor between the discharge and charging elevators of glass handling and heat treating apparatus.

And finally, it is a general object of the invention to provide glass handling and heat treating apparatus fulfilling the above objects and which may be operated in a convenient manner for the continuous production of heat treated glass, or bent heat treated glass.

These and other objects may be obtained by the glass handling and heat treating apparatus, constructions, parts, improvements, elements, combinations and sub-combinations which comprise the present invention, the nature of which is set forth in the following general statement, a preferred embodiment of which, together with its mode of construction and operation, is set forth in the following description, and which is particularly and distinctly pointed out and set forth in the appended claims forming part hereof.

The nature of the improvements of the present invention may be described in general terms as including in glass handling and heat treating apparatus, charging elevator loading mechanism; charging elevator mechanism including an elevator structure, an elevator car, guides for the car, raising and lowering mechanism for the car, and means on the car for engaging and disengaging a wheeled carrier; furnace pusher means; discharge elevator mechanism including an elevator structure, an elevator car, guides for the car, raising and lowering mechanism for the car, mechanism for controlling the stopping of the car at a predetermined position intermediate the limits of travel of the car, and means on the car for engaging and disengaging a wheeled carrier; bending mold mechanism including molds and means for operating the same; blast head mechanism including blast heads, means for lowering blast heads to, locating the same at and raising the same from a bending and blast station, blast head air control means, and means for imparting rotary movement to the blast heads; discharge elevator unloading mechanism; external conveyor means communicating between the discharge elevator unloading mechanism and the charging elevator loading mechanism; a furnace having a vertical entrance opening below the charging elevator mechanism, and a vertical discharge opening below the discharge elevator mechanism, heating means for the furnace, and means for supporting carriers advanced lengthwise of the furnace; cullet pan means for the furnace discharge opening including operating mechanism therefor; main air valve means for the blast heads; and safety, sequence, timing and control mechanism for the handling apparatus including electrical control and operating circuits, hydraulic control and operating valves and systems, and interacting means coordinating the operation of the hydraulic systems and electric circuits; whereby wheeled carriers supporting glass lights may be advanced substantially continuously through the handling and heat treating apparatus to carry out a heat treating cycle for making heat treated glass or bent heat treated glass.

An embodiment of the present improvements in glass handling and heat treating apparatus is illustrated in the accompanying drawings forming part hereof, in which Figure 1 is a fragmentary side elevation of the improved glass handling and heat treating apparatus showing more particularly the location of the furnace, charging and discharge elevators, and external conveyor, parts of the furnace being broken away;

Fig. 2 is a diagrammatic plan view of the external conveyor track, showing its relation to the furnace;

Fig. 3 is a cross sectional view of the furnace, taken on the line 3—3, Fig. 1;

Figs. 4, 5 and 6 are enlarged fragmentary sectional views taken on the line 4—4, Fig. 1, illustrating the operation of the elevator car engaging and disengaging means;

Fig. 7 is a fragmentary section, taken on the line 7—7, Fig. 1;

Fig. 10 is an enlarged end elevation and fragmentary section, certain of the parts being broken away, of the charging elevator, taken on the line 10—10, Fig. 1;

Fig. 11 is a fragmentary section taken on the line 11—11, Fig. 1;

Fig. 12 is an enlarged fragmentary end elevation section of the charging end of the furnace, taken on the line 12—12, Fig. 1;

Fig. 13 is a fragmentary plan view of the charging end of the furnace, and the charging elevator shown in Fig. 10;

Fig. 14 is a fragmentary section taken on the line 14—14, Fig. 13;

Fig. 15 is a section taken on the line 15—15, Fig. 14;

Fig. 16 is a vertical section of the discharge elevator, taken on the line 16—16, Fig. 1;

Fig. 17 is a fragmentary plan view of the discharge end of the furnace, and the discharge elevator shown in Fig. 16;

Fig. 18 is a view similar to a portion of Fig. 16, but showing the bending molds in a bending position at the bending and blast station;

Fig 19 is a view similar to portions of Figs. 16 and 18, but showing the air blast heads in a blast position at the bending and blast station;

Fig. 20 is a section taken on the line 20—20, Fig. 16;

Fig. 21 is a section taken on the line 21—21, Fig. 19;

Fig. 25 is a section taken on the line 25—25, Fig. 20;

Fig. 26 is an enlarged view, with certain parts in section, of the upper right hand corner of the charging elevator shown in Fig. 1, illustrating the elevator guide bearings;

Fig. 27 is a section taken on the line 27—27, Fig. 17;

Fig. 28 is a section taken on the line 28—28, Fig. 27;

Fig. 29 is a view similar to portions of Figs. 16 and 18, but showing the discharge elevator in fully raised position; and Fig. 30 is a partial wiring and piping diagram showing the electrical and hydraulic control devices.

Similar numerals refer to similar parts throughout the various figures of the drawings.

Figure 8:
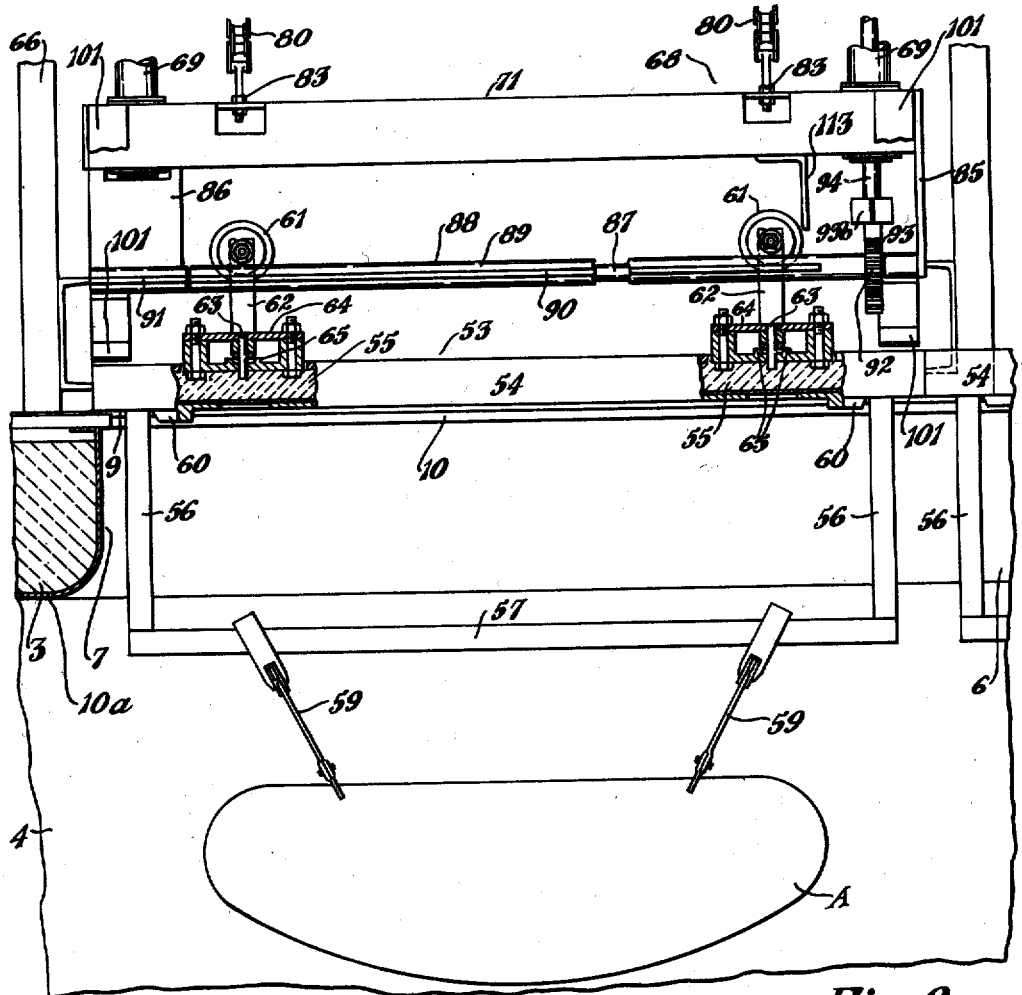
Fig. 8 is a fragmentary section taken on the line 8—8, Fig. 4, illustrating a wheeled carrier supported in engaged position by the charging elevator car and suspending a glass light in the furnace chamber.
Figure 9:
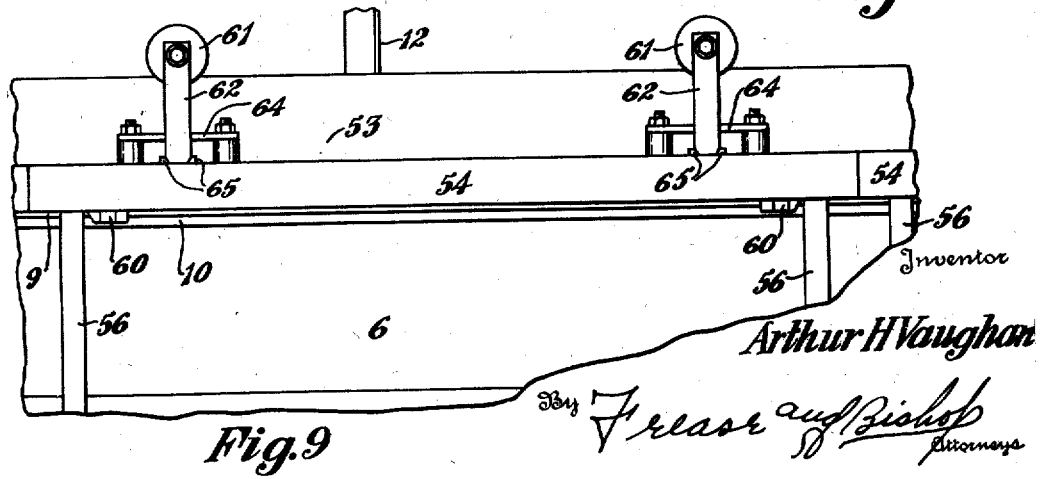
Fig. 9 is a fragmentary section taken on the line 9—9, Fig. 7.

The glass heating furnace generally indicated at 1 includes a metal casing 2 and a refractory lining 3 enclosing an elongated heating chamber 4. Any suitable means may be used for heating the chamber 4 to a suitable temperature for supplying heat to lights of glass A to be heat treated in the chamber 4; such as electric resistors 5, diagrammatically indicated in dot-dash lines in Fig. 1, and indicated in full lines in Figs. 3 and 10. The heating means, such as the electric resistors 5, may be supplied in a suitable manner with energy; and the supply of energy may be controlled so as to heat the lights A rapidly and uniformly to the desired final temperature in chamber 4.

The roof of the furnace 1 is provided with a narrow slot 6 extending longitudinally centrally thereof substantially throughout the length of the furnace; and the slot 6 is widened at each end thereof to provide a furnace entrance opening 7 (Fig. 4) and a furnace discharge opening 8 (Fig. 16). The furnace roof is provided with longitudinal track slide bars 9 (Figs. 4 to 7) located adjacent to, parallel with, and along each side of the narrow roof slot 6 and the entrance and discharge openings 7 and 8 for a purpose to be later described; and the track bars 9 are preferably mounted in grooves in the longitudinal top plates 10 supported at 11 from the furnace frame structure generally indicated at 12. The top plates 10 also support the furnace roof by metal plates 10a secured thereto and resting on the furnace side walls.

The furnace 1 is also provided with pusher means generally indicated at 13 in Figs. 1, 12 and 13, and the furnace pusher means includes a hydraulic cylinder 14 mounted at 15 at a lower corner of the entrance end of the furnace. A piston (not shown) operates in cylinder 14 and the piston rod 16 thereof is provided with a rack 17 at its upper end, which is backed up by roller 18, and engages pinion 19 mounted on one end of shaft 20.

A gear 21 is mounted on the other end of shaft 20 and engages a rack portion of pusher bar 22. Pusher bar 22, above gear 21, is backed up by roller 23 mounted at 24 on channel pusher frame 25. The forward end of pusher bar 22 is provided with a pusher nose 26; and the rear end of pusher bar 22 is provided with a spring tensioned slide pad 27 pivoted at 28 to pusher bar 22, which pad 27 slides on and engages pusher frame 25 for centering, guiding and steadying pusher bar 22 during operation thereof to be later described.

An opening 29 is provided in each end wall of furnace 1 for gaining access to the furnace chamber 4; and a plug door 30 is pivotally mounted at 31 on each furnace end wall for closing the openings 29.

The furnace discharge opening 8 is covered at certain times for several purposes, to be later described; and for accomplishing this a cullet pan 32 is provided, having wheels 33, which ride on rail members 34 supported on the furnace frame structure 12 (Figs. 1, 16, 17 and 18). The cullet pan 32 moves from a discharge opening covering position shown in full lines in Fig. 1, to a retracted position, shown in dot-dash lines in Fig. 1, and in full lines in Fig. 17. The operating mechanism for the cullet pan includes an air cylinder 35 mounted at 36 in a lower corner of the exit end of the furnace.

A piston (not shown) operates in cylinder 35, and the piston rod 37 thereof is provided with a rack 38 at its upper end, which is backed up by roller 39, and engages pinion 40 mounted on one end of shaft 41. Sprockets 42 are provided on shaft 41 for driving chains 43, which pass over another set of sprockets 44 mounted adjacent to the inner end of furnace discharge opening 8 (Figs. 1 and 17). The cullet pan 32 is secured by fingers 45 to chains 43 whereby movement of the piston in cylinder 35 in one direction or the other, moves the cullet pan 32 to the two positions illustrated in Fig. 1.

A charging elevator mechanism generally indicated at 46, and a discharge elevator mechanism generally indicated at 47, later to be described in detail, are located above the furnace, respectively, over the entrance opening 7 and discharge opening 8.

An overhead, preferably tramrail external conveyor 48 extends preferably in the form of a loop, as diagrammatically shown in Fig. 2, from the discharge elevator mechanism 47 to the charging elevator mechanism 46 to provide a conveyor communication between the discharge elevator and charging elevator.

The external conveyor preferably includes a monorail inverted T-track 49 formed with appropriate straight and curved portions to provide any desired loop such as the loop shown; and the track 49 may be suspended in any usual manner by suspension members 50 (Figs. 1 and 11).

The external conveyor loop track 49 terminates at one end at a charging elevator loading station generally indicated at B, and at the other end at a discharge elevator unloading station generally indicated at C; an end of the station B being adjacent to and elevated substantially vertically above an end of the furnace entrance opening 7, and an end of the station C being adjacent to and elevated substantially vertically above an end of the furnace discharge opening 8.

The external conveyor loop 49 may be provided at any convenient place with a switch 51, which communicates with a siding 52 (Fig. 2) for a purpose to be later described.

A plurality of carriers generally indicated at 53 are provided for handling the glass lights A being heat treated. These carriers 53, and certain parts associated therewith, must incorporate known features of design, for avoiding glass handling difficulties; and in addition, must be capable of being handled on the external conveyer 48, on the charging and discharging elevators 46 and 47, and along furnace track 9.

Referring more particularly to Figs. 4 to 9, each carrier 53 includes a preferably box-like member 54 preferably filled with any suitable insulation material 55. When a carrier 53 is passing along furnace 1, the body member 54 preferably is supported and slides on track slide bars 9. Alternatively, slide bars 9 may be formed as rails and carrier body member 54 may be provided with wheels to ride on such rails. However, the sliding arrangement shown is preferred for more effectively closing and sealing furnace slot 6—7—8.

Two or more vertical bars 56 are attached to the carrier body 54, which bars 56 in turn support a preferably horizontal bar 57, the upper face of which is preferably grooved at 58. When a carrier 53 is positioned on furnace sliding bars 9, the horizontal bar 57 thereof is located within the furnace heating chamber 4. Tongs 59 of known design are preferably used to suspend glass lights A vertically from horizontal bar 57.

The glass lights A shown, are of a size and shape used as a rear light for a closed automobile. It is to be understood, however, that the invention is not limited to the particular shown shape of glass light, because glass of various sizes and shapes can, by modifying the blast and mold mechanism if necessary, be handled in the improved apparatus. Moreover, more than one light may be suspended from each carrier as by lengthening vertical bars 56 and providing a plurality of spaced horizontal bars 57.

The carriers 53 are moved longitudinally of furnace 1 by the pusher means 13 previously described. Each carrier is also preferably provided with one or more lugs 60 for guiding the carrier as it passes along furnace 1 and for centering bars 56 in narrow slot 6. The narrow furnace slot 6 is only wide enough to permit free passage of the carrier bars 57; and the enlarged openings 7 and 8 at the ends of narrow slot 6 are only wide enough to permit entry of tongs 59, suspending lights A into, and withdrawal of the same from, the furnace heating chamber 4.

Previously known glass handling carriers have incorporated some of the general features just described, but the present invention involves supporting and transporting the carriers on the external conveyor track system 48. For this purpose, each carrier 53 is also provided with wheels 61 rotatably mounted on U-shaped bracket yokes 62, and the wheels 61 are adapted to engage the monorail track 49, as best shown in Fig. 11. The yokes 62 are pivotally mounted at 63 on the carrier body member 54 to permit rotation of the yokes as required by curvature in the external conveyor track 49.

As stated, it is necessary that the yokes 62 be capable of rotation with respect to the member 54 when a carrier 53 is suspended from external track 49. On the other hand, when a carrier 53 is moving along the furnace, it is desired that the axes of the wheels 61 be maintained at right angles to the path of carrier movement for a reason to be later described.

For this purpose, each yoke pivot mounting 63 preferably includes a strap 64 secured to the carrier body 54, under which the yoke 62 engages, which permits a slight relative vertical movement between each yoke 62 and the carrier body member 54; and therefore permits pivoting of yoke when at its upper limit of movement. One or more lugs 65 are provided on the carrier body 54 adjacent the pivot 63 for holding the yoke 62 against pivoting movement when the carrier 53 is not suspended by the yoke 62 and wheels 61, and when yoke moves by gravity to its lower limit of movement.

Thus, in Figs. 4 and 8, the yokes 62 are free to move pivotally with respect to the carrier body member 54, because the carrier wheels 61 are being supported. On the other hand, in Figs. 5, 6, 7 and 9, when the carrier wheels are unsupported, the yokes 62 are held by lugs 65 against pivoting movement.

The charging elevator mechanism generally indicated at 46 includes an elevator frame structure 66 (Fig. 1) certain parts of which are omitted or broken away in some of the views for the sake of clearness.

Spaced upper and lower guide bearings 67 are mounted on the frame structure 66 near the upper end thereof (Fig. 26) and on opposite sides (Fig. 1) centrally of a so-called elevator shaft formed generally by the frame 66 (Figs. 10 and 13).

The elevator car generally indicated at 68 in Fig. 1, includes a pair of vertically movable, hollow slide rods 69, which slide through said guide bearings 67, and upper and lower frame members generally indicated respectively at 70 and 71, secured to the rods 69.

The elevator car 68 moves vertically between upper and lower limiting positions, the lower position being shown in Figs. 1, 4, 5, 6, 8, 10, 13 and 26; and the upper position of car frame member 71 being illustrated by dot-dash lines in Fig. 10. Movement of the elevator car 68 is effected by an operating mechanism which includes a hydraulic cylinder 72 mounted at 73 on the charging elevator frame 66 near the upper end thereof.

A piston (not shown) operates in cylinder 72 and the piston rod 74 thereof is provided with a rack 75, which is backed up by roller 76 and engages pinion 77 mounted on one end of shaft 78.

Two driven sprockets 79 are mounted on shaft 78 within the so-called elevator shaft, over which chains 80 pass. Chains 80 also pass under idler sprockets 81 and over idler sprockets 82 (Fig. 10), which sprockets are also mounted on elevator frame 66. One end of each of chains 80 is secured at 83 to the lower car frame member 71; and a counterweight 84 is secured to the other end of each chain 80 for balancing the weight of the elevator car parts.

Brackets 85 and 86 extend downward from each end of frame member 71 (Figs. 4, 5, 6 and 8) and a rod 87 extends between the brackets 85 and 86. A rotatable track member 88 is journaled on rod 87 and the same includes a tubular portion 89 and longitudinal wing or rib portions 90; the length of the rib portions 90 being greater than the spacing of the carrier yokes 62. A bracket 86 likewise has radial ribs 91 corresponding to and in continuation of the ribs 90; and the end of tubular portion 89 adjacent bracket 85 is provided with an integral pinion 92, which meshes with a rack 93. The rack 93 is backed up by roller 93a mounted on bracket 85; and rack 93 is attached at 93b to the lower end of rod 94, which extends through one of hollow slide rods 69.

The upper end of rod 94 (Fig. 26) is secured to lever 95 mounted on shaft 96, which in turn is mounted at 97 on the upper elevator car frame member 70. Another lever 98 is mounted on shaft 96, to which is connected a piston rod 99 of "thrustor" 100, also mounted on upper frame member 70.

Thus, operation of thrustor 100, to be later described in detail, moves rack 93 so as to produce rotation of track member 88 from the position shown in Figs. 4 and 5 to the position shown in Fig. 6 (slightly less than 90°).

Referring to Fig. 4, rotatable track member 88 is longitudinally aligned with furnace slot 6; and when the elevator car 68 is at its upper limit of travel, and rotatable track member 88 is in the position shown in Fig. 4, the ribs 90 thereof are aligned with the wheel supporting flanges at the end of external track 49 at station B.

Referring to Figs. 4, 5 and 6, spring fingers 101 are provided extending downward from lower car frame member 71 for engagement with furnace frame structure 12 to accurately center elevator car with respect to the furnace opening 7 as the car reaches its lower limit of travel.

Associated with the charging elevator loading station B and the charging elevator mechanism 46 is a charging elevator loading mechanism generally indicated at 102, which includes a track support 103 (Figs. 13, 14 and 15) mounted on charging elevator frame 66. Support 103 has mounted thereon upper and lower track members 104 on which run double flanged wheels 105 of loader carriage 106. Carriage 106 is connected to piston rod 107 extending from a piston (not shown) in cylinder 108 also mounted at 109 on support 103.

A loader engaging finger 110 is pivotally mounted at 111 on loader carriage 106 and is normally maintained by spring 112 in the position shown in Figs. 13, 14 and 15, so as to engage the left hand end (viewing Fig. 13) of a carrier 53 indicated in dot-dash lines, located at loading station B. The spring tensioned arrangement and shape of finger 110 enables the finger 110 to cam along the side of a carrier body member 54 in being moved by piston rod 107 to the left to locate the finger 110 at the position shown in full lines in Fig. 13.

Movement of the loader carriage 106 to the right from the full line position shown in Fig. 13, when charging elevator car 68 is in the raised position shown in dot-dash lines in Fig. 10, will cause carrier 53 to travel on wheels 61 from monorail track 49 onto ribs 90 of elevator car rotary track 88 until further movement of the carrier 53 to the right (Figs. 1 and 8) is stopped by the engagement of wheel 61 against stop member 113.

Elevator car 68 may then be lowered to the position shown in Fig. 4, wherein carrier body member 54 rests on track slide bars 9. Further downward movement of elevator car 68 causes rotary track 88 to be disengaged from carrier wheels 61 to a position spaced below the same, as shown in Fig. 5. Thrustor 100 may then be operated to rotate rotary track member 88 to the position shown in Fig. 6, whereupon the member 88 may be withdrawn through the space between wheels 61 and elevator car 68 may be raised, leaving carrier 53, thus transferred from loading station B, in the position occupied by the left hand carrier 53 in Fig. 1.

The discharge elevator mechanism generally indicated at 47, is similar in many respects to charging elevator mechanism 46. The construction is best illustrated in Figs. 1, 16, 17, 18 and 19 and includes a frame structure 66a (Fig. 1) certain parts of which are omitted or broken away in some of the views for the sake of clearness.

Spaced upper and lower guide bearings 67a are mounted on the frame structure 66a near the upper end thereof (Figs. 16 and 18) and on opposite sides (Fig. 1) centrally of the so-called elevator shaft formed generally by the frame 66a (Figs. 16 and 17).

The elevator car, generally indicated at 68a in Fig. 1, includes a pair of vertically movable, hollow slide rods 69a, which slide through said guide bearings 67a, and upper and lower frame members generally indicated respectively at 70a and 71a, secured to the rods 69a.

The elevator car 68a moves vertically between upper and lower limiting positions, the lower position being shown in Figs. 16 and 17; and the upper position being shown in Figs. 1 and 29. The elevator car 68a also has a third or intermediate position of rest when a glass light A, on a carrier 53 being raised by the elevator car 68a, is stopped for treatment at a bending and blast station intermediate the limits of the discharge elevator car travel, as shown in Figs. 18 and 19. Movement of the elevator car 68a is effected by an operating mechanism which includes a hydraulic cylinder 72a mounted at 73a on the discharge elevator frame 66a near the upper end thereof.

A piston (not shown) operates in cylinder 72a and the piston rod 74a thereof is provided with a rack 75a, which is backed up by a roller 76a similar to roller 76, and engages pinion 77a mounted on one end of shaft 78a.

Two driven sprockets 79a are mounted on shaft 78a within the so-called elevator shaft, over which chains 80a pass. Chains 80a also pass under idler sprockets 81a and over idler sprockets 82a (Fig. 16), which sprockets are also mounted on elevator frame 66a. One end of each of chains 80a is secured to the lower car frame member 71a in the same manner as chains 80 are secured to lower car frame member 71; and a counterweight 84a is secured to the other end of each chain 80a for balancing the weight of the elevator car parts for a purpose to be hereinafter described.

The construction of the discharge elevator car 68a is identical with the construction of the charging elevator car 68; and Figs. 4, 5, 6 and 8 are illustrative of the discharge elevator car 68a excepting for the operation thereof. Thus, a rod 94a, for operating a rotatable track member similar to rotatable track member 88, extends through one of hollow slide rods 69a and the upper end of said rod 94a (Figs. 1 and 17) is secured to lever 95a mounted on shaft 96a, which in turn, is mounted at 97a on the upper elevator car frame member 70a.

Another lever 98a is mounted on shaft 96a, to which is connected a piston rod 99a of thrustor 100a, also mounted on upper frame member 70a. Thus, operation of thrustor 100a, to be later described in detail, moves the rack of the discharge elevator car 68a so as to produce rotation of the track member thereof from a position such as shown in Figs. 4 and 5 to a position such as shown in Fig. 6 (slightly less than 90 degrees). There is, however, a difference in the operation of thrustors 100 and 100a, and the rotatable track members controlled thereby.

When the charging elevator thrustor 100 has been energized, the charging elevator car rotatable track member 88 is moved to the vertical position shown in Fig. 6; but when the discharge elevator thrustor 100a has been energized the discharge elevator car rotatable track member is moved to a horizontal position, such as shown in Figs. 4 and 5.

The third or intermediate position of the discharge elevator car 68a associated with the stopping of a glass light A at the bending and blast station is provided by hydraulic stop cylinder 114 (Figs. 16 and 17) mounted at 115 on the discharge elevator frame 66a near the top thereof in alignment with hydraulic cylinder 72a.

A piston (not shown) operates in cylinder 114 and the piston rod 116 thereof is provided with a ram head 117, which when extended will arrest the motion of rack 75a and thus prevent completion of the upward elevator stroke at a predetermined point associated with suspension of a glass light at the bending and blast station as illustrated in Figs. 18 and 19. This is accomplished by making the cylinder 114 and piston therein of larger diameter than the cylinder 72a and the piston therein, and by supplying the same hydraulic pressure to both cylinders when operating the piston in cylinder 72a.

Associated with the discharge elevator unloading station C and the discharge elevator mechanism 47 is a discharge elevator unloading mechanism generally indicated at 118 (Figs. 1, 16, 17, 27 and 28), which includes a hydraulic cylinder 119 mounted at 120 on a frame support 121 extending from the discharge elevator frame 66a. A piston (not shown) operates in cylinder 119 and the piston rod 122 thereof is secured at its outer end to a pusher nose 123, which is also secured to an inverted T-shaped track guide bar 124 (Fig. 28).

The flanges of track guide bar 124 engage upper flanged rollers 125 and lower flanged rollers 126 rotatably journaled respectively at 127 and 128 on frame support 121. The discharge elevator unloading mechanism 118 thus is arranged by operating piston 122 from the left to the right in Figs. 1 and 27 to propel a carrier 53 engaged by pusher nose 123 so that the carrier wheels 61 travel longitudinally along the ribs of discharge elevator rotary track and onto monorail track 49, to the position shown in full lines at discharge elevator unloading station C in Fig. 1. In thus unloading a carrier 53 from the discharge elevator car 68a, the car 68a must of course be in the raised position shown in full lines in Fig. 1; and the carrier 53 is at that time in alignment with unloading cylinder 119.

Bending equipment and air blast equipment are also associated with the discharge elevator and are located at a bending and blast station positioned intermediate the limits of travel of the discharge elevator car within the so-called shaft of the discharge elevator immediately above the furnace exit or discharge opening 8.

Figure 24:
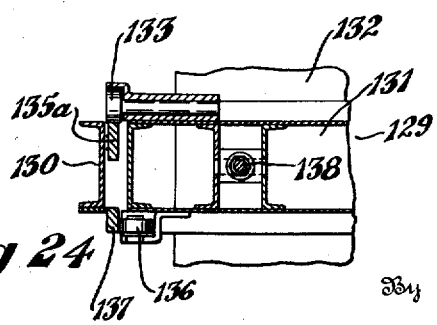
Fig. 24 is a section taken on the line 24—24, Fig. 20.

The bending mold mechanism generally indicated at 129 (Figs. 1, 16, 18, 19, 20, 23, 24 and 25) is mounted in a subframe structure 130 carried by the discharge elevator frame 66a and includes wheeled mold carriages 131 provided with detachable molds 132 having the desired curvature. The carriages 131 are provided with upper wheels 133 and lower wheels 134 which engage and ride on trackways 135 and 135a; and are also provided with lower side thrust wheels 136 which engage and ride on trackways 137 (Fig. 24). The wheel and track mounting of the carriages 131 just described maintains alignment of the molds and exact matching thereof when operated.

Carriages 131 are actuated for reciprocating movement by connecting rods 138 and crank shafts 139 having sprockets 140 thereon, the crank shafts 139 also being mounted in frame structure 130.

A chain 141 passes around both sprockets 140 and preferably has its upper strand attached at 142 to the connected piston rods 143 and 144 of a pair of opposed single acting hydraulic cylinders 145 and 146 respectively, which cylinders 145 and 146 are also mounted on frame structure 130.

Cylinders 145 and 146 are of such length as to produce a 360 degree rotation of crank shafts 139 with a single stroke; thus moving the molds 132 from the retracted position shown in Figs. 1, 16, 19 and 20, toward each other to the closed position shown in Fig. 18 and again to the retracted position during said 360 degree rotation of said crank shafts 139. Of course the next time that the pistons in cylinders 145 and 146 are operated, the piston rods move in the opposite direction so as to again produce 360 degree rotation of crank shafts 139, but in the opposite direction.

The 360 degree rotation of crank shafts 139 is used to avoid any delay even momentarily incident to valve reversal if the crank shafts were operated 180 degrees and then reversely rotated 180 degrees. The effect of such delay, even for an instant, would be bad because of a chilling effect to the glass when under pressure between molds 132.

This arrangement for operating molds 132 by crank shafts, assuming constant angular velocity thereof, produces simple harmonic motion of the molds.

This cycle of operation is desirable because the material being bent is glass and glass must not be subjected to excessively rapid bending. However, the bending operation must be performed in a minimum permissible time. With this arrangement the mold movement for the most part is quick and the molds move to perform a bending operation and back to a retracted position within about two seconds.

Moreover, the hydraulic operating and control system for cylinders 145 and 146 is so adapted and arranged that the relative speeds of molds 132 during a cycle of operation may be further controlled in the manner described, as will be more fully set forth when the safety, timing, control and operating mechanisms are described. In this connection, cams 225, 226, 231 and 232 on crank shafts 139 are arranged to operate cam pieces for actuating valves associated with the hydraulic circuit to be later described.

The curved or bent shape of glass lights A resulting from the bending operation is indicated at AA in Figs. 18 and 19 and in dot-dash outline in Fig. 21.

The air blast equipment previously referred to is generally indicated at 148 (Figs. 1, 16, 17, 18, 19, 21 and 22) and is mounted on the discharge elevator frame 66a. The air blast equipment includes a pair of curved "blast heads" 149 having substantially the curvature of molds 132 and bent lights AA (Figs. 20 and 21); and the blast heads 149 are pivotally mounted at 150 at each upper corner thereof upon crank shafts 151 carried in housings 152.

Housings 152 are secured to lower longitudinal box members of substantially rectangular support frames 153. Support frames 153 are each pivotally supported at the inner ends of upper supporting arms 154 and lower supporting arms 155, the outer ends of which are pivotally mounted to fixed discharge elevator frame 66a.

Figure 22:
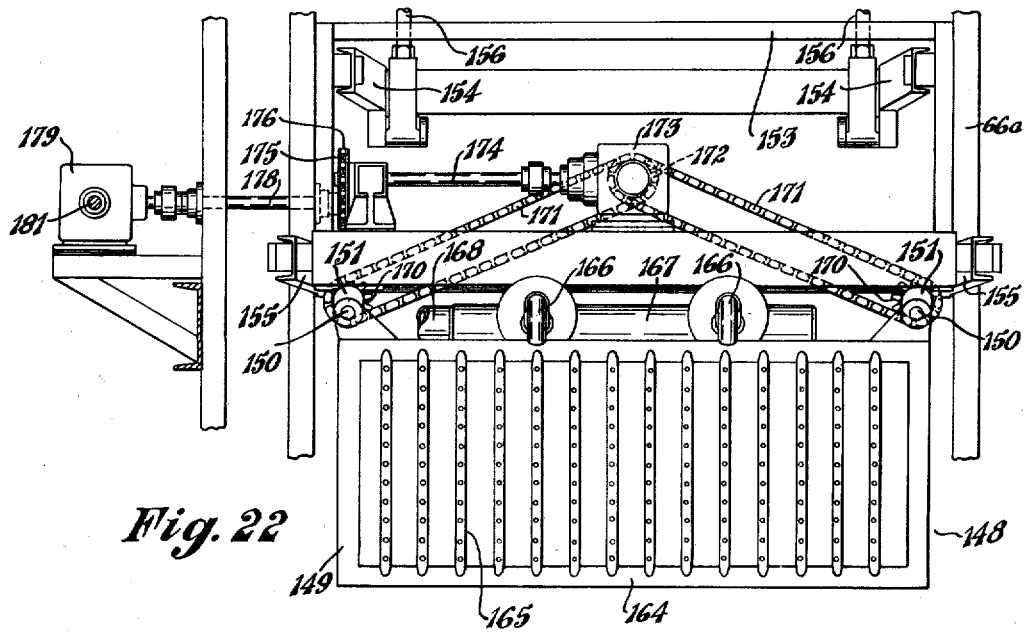
Fig. 22 is a section taken on the line 22—22, Fig. 21.
Figure 23:
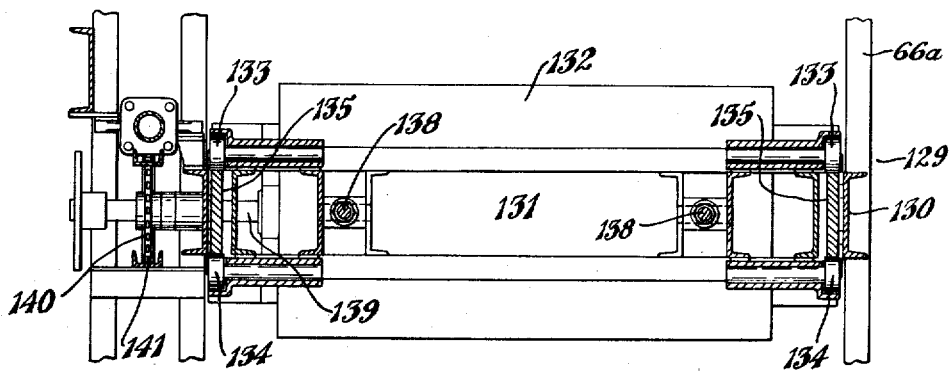
Fig. 23 is a section taken on the line 23—23, Fig. 20.

Thus, viewing Fig. 16, each support frame 153, arms 154 and 155, and elevator frame 66a form an approximate parallelogram system movable between an upper limiting position shown in Figs. 1, 16, 17 and 18, and a lower limiting position shown in Figs. 19, 21 and 22. The parallelogram is said to be approximate because the distance between the pivotal mountings of arms 154 and 155 on support frame 153 is slightly greater than the distance between the pivotal mountings of said arms on elevator frame 65a for a purpose to be later described.

Movement of the support frames 153, and therefore the blast heads 149 carried thereby, from the upper position shown in Fig. 16 to the lower position shown in Fig. 19 is effected by operation of connecting rods 156 pivotally connected to upper support arms 154 and to crank shafts 157.

Sprockets 158 are mounted at one end of each crank shaft 157 and a chain 159 passes around both sprockets 158 and preferably has its upper strand attached at 160 (Fig. 17) to the piston rod 161 of hydraulic cylinder 162 mounted at 163 on discharge elevator frame 66a.

Cylinder 162 is of such length as to rotate crank shafts 157 through 180 degrees, so that operation of the piston in cylinder 162 in one direction lowers blast heads 149 from the position of Fig. 16 to that of Fig. 19, and operation of the piston in the other direction raises blast heads 149 from the position of Fig. 19 to that of Fig. 16.

When the blast heads 149 are in the position shown in Fig. 19, they occupy substantially the same position just previously occupied by the bending molds 132 at the bending and blast position, as illustrated in Fig. 18. As has been previously stated, in heat treating glass, it is necessary to perform the blast operation as quickly as possible after removal of the glass from the furnace.

However, the bending operation must be performed before the blast operation, so that it is desirable to perform both bending and blasting at one station immediately above the furnace exit opening. It has been previously noted that the operation of the bending molds occurs in about two seconds; and as the bending molds are being retracted, blast heads 149 may be moved down.

In order to bring the blast heads 149 as closely as possible to the bent lights AA and also to the blast position as quickly as possible, the parallelogram arrangement previously referred to is made approximate rather than exact so as to enable the distance of mold travel to be reduced and therefore to save a fraction of a second of time for the removal of the molds, thus permitting downward movement of the blast heads 149 (as the molds are being retracted) to the blast position previously occupied by the molds 132 a little quicker.

Each blast head 149 is preferably formed of an outer tubular frame member 164 having a series of perforated tubes 165 connected thereto from which a series of fluid, preferably air jets are blown. The air is supplied to each tubular frame 164 by flexible tubes 166 leading from headers 167. Headers 167 are connected (not shown) together by piping 168 and to a main air valve 169, shown in Fig. 30.

The air blast jets should not be directed constantly at certain spots on the glass lights AA being cooled; and the jets must therefore be moving at all times when on. For providing such movement, each blast head 149 is gyrated or rotated in a small circle in the general plane of the blast head by the mounting on crank shafts 151. Rotation of blast heads 149 results by constantly rotating crank shafts 151 through a drive including sprockets 170, chains 171, sprockets 172, gears in gear cases 173, shafts 174, sprockets 175, chains 176, sprockets 177, shafts 178, gears in gear cases 179, shafts 180 and 181, gears in gear case 182 driven by motor 183; which drive is best shown in Figs. 21 and 22.

The foregoing constitutes a detailed description of the various parts of the improved apparatus for handling and heat treating glass, except the safety, timing, control and operating mechanisms which will be described in connection with the operation of the apparatus.

In connection with the illustration of some mechanisms in certain of the figures of the drawings, some parts which would normally appear in those figures have been omitted so as to provide a clearer illustration of the particular mechanisms shown in such figures of the drawings. For example, in many of the figures of the drawings the frame structures have not been shown fully; and in Fig. 13 the carriers have been omitted.

In the foregoing detailed description, the functions, purposes or operations of certain mechanisms have been omitted for subsequent description, as follows:

The cullet pan 32 is provided for covering the furnace discharge opening 8 and carriers thereat to protect the same at all times, except when the discharge elevator 47 is removing or about to remove a carrier from the furnace through the opening 8. This protection is desired so that an accumulation of broken glass or cullet on carriers will be prevented, since such accumulation might interfere with engagement or disengagement of the carriers by the elevators.

Counterbalances 84 and 84a are provided respectively for the charging and discharge elevators 46 and 47 to reduce the necessary operating effort and to keep the operating chains tight on the sprockets.

Likewise, pusher bar 22 is centered, guided and steadied during operation thereof so that it will engage a carrier 53 above the furnace entrance opening 7 and advance it, together with a series of carriers 53 ahead of it, along furnace 1, evenly and steadily and with a minimum of jarring to glass lights A suspended from the carriers 53.

Similarly, the axes of carrier wheels 61 must be maintained at right angles to the path of carrier movement when a carrier 53 is moving along furnace 1 so that the wheels 61 will be in a proper position to be engaged by the rotatable track member of the discharge elevator car 68a at the furnace discharge opening 8 without any bumping or jarring of the carrier 53 incident to such engagement, which might jar or damage glass lights A suspended by the carrier.

Thrustors 188 and 188a are well known electrical-hydraulic units, which impart rectilinear motion to a push rod or ram from a rotating electric motor when the latter is started. The thrustors 188 and 188a are used on the charging and discharge elevator cars 68 and 68a, which are moving parts, so as to enable the elevator car track engagement and disengagement with carrier wheels 61 to be remotely controlled in a simple manner by the electrical wiring to the thrustors.

The siding 52 and track switch 51 of the external conveyor system 48 permits carriers 53 to be removed from or replaced in the external conveyor system for repairs or the like.

The operation of the improved apparatus for handling and heat treating glass may be best described and understood by first briefly outlining the movement of a particular carrier 53; from which a glass light A is suspended, through the apparatus; by then outlining briefly the "cycle of operation" of the apparatus; and by then describing in detail the operation of the safety, timing, control and operating mechanisms which initiate, perform and control the cycle of operation.

Movement of carrier

Carriers 53 are preferably manually moved along external conveyor track loop 48 from discharge elevator unloading station C to charging elevator loading station B. Heat treated lights AA are removed from carriers 53 at some convenient place, either at one of said stations or between the same; and glass lights A to be heat treated are suspended from carriers 53 at some convenient place, either at one of said stations or between the same, along external conveyor loop track 48.

A particular carrier 53 with a glass light A suspended therefrom is manually moved to a position somewhat as shown by the carrier 53 at station B in Fig. 1. Charging elevator loading mechanism 102 loads said carrier 53 onto charging elevator car 68. Charging elevator car 68 moves downward to "down" position so as to enter glass light A suspended by said carrier 53 into furnace 1 through furnace entrance opening 7. Charging elevator car track 88 is disengaged from said carrier 53 so that charging elevator car 68 may be raised to "up" position to be ready for receiving another carrier 53 from charging elevator loading mechanism 102.

At the proper time furnace pusher means 13 operates to advance said carrier 53 along heating furnace 1, together with all other carriers 53 ahead of said carrier 53 in the heating furnace. When said carrier 53 becomes, through successive operations of furnace pusher means 13, the forward carrier of the series of carriers 53 from which glass lights A are suspended in heating furnace chamber 4; and is located at furnace discharge opening 8, discharge elevator car 68a at the proper time descends to "down" position and its rotary track engages said carrier 53.

Discharge elevator car 68a then raises until glass light A is located at the bending and blast station, when bending mold mechanism 128 operates to bend glass lights A to the shape indicated at AA and immediately air blast equipment 148 operates to cool the glass light AA suspended from said carrier 53 at the bending and blast station.

At the proper time discharge elevator car 68a is raised to "up" position, and discharge elevator unloading mechanism 118 operates to transfer said carrier 53 from discharge elevator car 68a to discharge elevator unloading station C, as shown in Fig. 1.

Said carrier 53 is then manually moved along external conveyor loop track 48, in turn, until the convenient station is reached where the bent heat treated light AA is removed from said carrier 53. Thereafter, a new light A is suspended therefrom and said carrier is ready to again move through the apparatus in the manner just described.

However, the improved apparatus does not handle only one carrier 53 at a time, but automatically handles a plurality of carriers 53 at all times when in operation. That is to say, during the substantially automatically continuous operation of the improved apparatus, there is a carrier 53 at practically each stage of progress through the apparatus.

Cycle of operation

The cycle of operation of the improved apparatus for handling and heat treating glass may be conveniently described as consisting of twelve steps. Assume that all parts of the apparatus are momentarily at rest with discharge elevator car 68a in down position with its rotatable track in a horizontal position engaging wheels 61 of a carrier 53 located at discharge opening 8 of heating furnace 1.

*Step 1.*—The timer 185 makes a momentary contact to commence the cycle of operation, when the equipment is on continuous operation, the parts being momentarily at rest at the positions stated. Alternatively, push button 184 may be used to make the necessary contact. In either event discharge elevator car 68a then lifts by operation of cylinder 72a until stopped by ram head 117 of stop cylinder 114. At this time the carrier 53 on discharge elevator car 68a suspends a glass light A at the bending and blast station.

*Step 2.*—Bending mold mechanism 129 operates to move molds 132 toward each other and bend glass light A (Fig. 18) to shape AA and then return to open position shown in Fig. 20 by operation of cylinders 145 and 146. At the same time, cullet pan 32 moves in to the position shown in full lines in Fig. 1 by operation of air cylinder 35.

*Step 3.*—Blast heads 149 of air blast equipment 148 move down to the position shown in Fig. 19 by operation of cylinder 162. Blast timer 249 starts to operate. Blast heads 149 are being rotated or gyrated by motor 183, which runs continuously. Main air valve 169 opens by operation of its control cylinder 169a. At the same time furnace pusher means 13 moves to the right (Fig. 1) by operation of cylinder 14 to advance the series of carriers 53 along furnace 1.

*Step 4.*—Furnace pusher means 13 retracts by operation of cylinder 14.

*Step 5.*—Charging elevator car 68 lowers by operation of cylinder 72 and when it reaches the down position shown in Fig. 10, thrustor 100 is energized to cause rotary track 88 to open to a vertical position shown in Fig. 6.

*Step 6.*—Charging elevator car 68 raises to up position by operation of cylinder 72, and thrustor 100 is deenergized moving track 88 to horizontal position such as shown in Figs. 4 and 5.

*Step 7.*—Charging elevator loading mechanism 102 operates (Figs. 13, 14 and 15) to transfer a carrier 53 from station B onto charging elevator car 68 by operation of cylinder 108.

*Step 8.*—Charging elevator loading mechanism 102 retracts by operation of cylinder 108. Blast heads 149 of air blast equipment 148 are raised to position shown in Figs. 16 and 18 by operation of cylinder 162. Timer 249 stops the blast upon the expiration of a set interval of time. Main air valve 169 closes by operation of its control cylinder 169a.

*Step 9.*—Ram head 117 retracts or moves to left by operation of stop cylinder 114 (Fig. 29), permitting discharge elevator cylinder 72a to raise discharge elevator car 68a from bending and blast station to up position shown in Fig. 1.

*Step 10.*—Discharge elevator unloading mechanism 118 moves carrier 53 from discharge elevator car 68a to station C by operation of cylinder 119. Thrustor 100a of discharge elevator mechanism 47 is deenergized, moving the discharge elevator car track to a vertical position such as shown in Fig. 6.

*Step 11.*—Discharge elevator unloading mechanism 118 retracts by operation of cylinder 119. Cullet pan 32 moves out to the position shown in dot-dash lines in Fig. 1 by operation of air cylinder 35.

*Step 12.*—Discharge elevator car 68a lowers to "down" position by operation of cylinder 72a. Discharge elevator ram head 117 moves out to the position shown in Fig. 17 by operation of stop cylinder 114. Discharge elevator thrustor 100a is energized to move the rotary track of discharge elevator car 68a to the horizontal position shown in Fig. 5 for engagement with the wheels 61 of a carrier 53 located at furnace discharge opening 8.

In certain figures of the drawings, which are general views, the parts of more than one of the related mechanisms are shown; and for illustrative purposes they are shown in positions which they are not in coincidentally. Thus, in Fig. 1, the charging elevator mechanism 46 is shown with the car 68 thereof in down position and the discharge elevator mechanism 47 is shown with the car 68a thereof in up position.

Referring to the cycle of operation, the two elevator cars 68 and 68a are never coincidentally in the positions shown; for when the discharge elevator car 68a is up (steps 9 to 12) the charging elevator car 68 is also up, and when the charging elevator car is down (step 5) the discharge elevator car 68a is at the intermediate bending and blast station.

Each of the mechanism operating cylinders 14, 72, 72a, 108, 114, 119, 145, 146, 162 and 169a is a hydraulic cylinder, the hydraulic operation of which is controlled by solenoid or electrically actuated valves to be presently described. Air cylinder 35 is also controlled by a solenoid valve. Thrustors 100 and 100a are also electrically controlled and include a hydraulic system therein. Thus, all of the operating means for the various mechanisms of the improved apparatus (excepting rotation of blast heads 149 by the continuously running motor 183) may be termed electrically actuated hydraulic operating means.

Moreover, each of hydraulic cylinders 14, 72, 72a, 108, 114, 119, 145, 146 and 162 has a speed control to regulate, retard or cushion the starting and stopping thereof, as will be presently described.

Control apparatus

The safety, timing, control and operating mechanisms, which initiate, perform and control the cycle of operation and automatically control the improved glass handling and heat treating apparatus are illustrated in Fig. 30 which is a partial diagram of wiring and piping.

The control devices shown in this diagram include the following:

A cycle start timer 185;

A sequence controller, shown generally at 190, and including cam shaft 190b, cams 190c, and solenoid 190a. Contacts S1 to S28 are actuated by cams 190c. Solenoid 190a is connected to cam shaft 190b by ratchet mechanism 190d having a pawl and a ratchet wheel with 12 teeth in such manner as to rotate the latter one-twelfth (1/12) revolution each time the solenoid is energized;

Relays, such as 191, energized by contacts S13 to S28. These relays are operatively connected with solenoid valves and certain other devices;

Hydraulic control valves such as solenoid operated pilot valve 192, pilot operated main valve 193, and solenoid operated main valve 211. (There is also one solenoid operated air valve 255); and Interlocking limit switches, such as 186, operatively associated with various parts of the mechanical apparatus.

Each of the hydraulic operating cylinders is generally controlled by control devices such as have just been enumerated; although there are certain exceptions to this general statement, or certain additional devices in particular instances, as will appear in the succeeding description.

The operation of the control devices commencing at step 1 is as follows:

Cycle star timer 185 or push button 184 makes a momentary contact. Circuit is established from line X through limit switch 186 (closed when stop cylinder ram head 117 is out), limit switch 187 (closed when thrustor 180a is in energized position with the discharge elevator car track engaged), limit switch 188 (closed when discharge elevator car 68a is down), interlock contact S12 of sequence controller 190, coil of relay 189 to line Y.

Sequence control solenoid 190a is energized by relay 189 rotating cam shaft 190b for one-twelfth (1/12) revolution. Contact S12 opens, deenergizing relay 189 and thus deenergizing solenoid 190a. Contact S13 of sequence control 190 is closed by rotation, establishing circuit from line X through S13, coil of relay 191, to line Y. Relay 191 closes, energizing solenoid 192a associated with pilot valve 192, thus offsetting valve plunger.

Valve 192 actuates main valve 193 in such direction as to cause oil from main pressure line 194 to flow through cylinder line 195 to head end of cylinder 72a which operates discharge elevator 47. Oil is discharged from rod end of cylinder 72a through cylinder line 196, valve 193, return line 197, by-pass line 198, throttling valve 199 and common return 200 to return main 201.

When discharge elevator car 68a is fully down, cam 202 holds slow down valve 203 closed, thus forcing all oil discharged from rod end of cylinder 72a to pass through valve 199. Valve 199 is adjusted to produce desired slow speed for starting without excessive shock. Soon after piston of cylinder 72a starts to move, cam 202 gradually allows slow down valve 203 to open, thus permitting more oil to pass and consequently increasing speed of elevator car 68a. With free flow through valve 203, the elevator speed is controlled by main throttling valve 204 in pressure line 205.

Elevator travels at full speed until cam 206 actuates slow down valve 203, again reducing speed. Elevator continues to travel until end of rack 75a engages ram head 117 of stop cylinder 114, preventing further motion. Elevator car 68a is now at rest at the intermediate position of the bending and blast station.

Slightly before elevator car 68a arrives at said intermediate position, limit switch 207 is closed. Circuit is established from line X through limit switch 207, sequence controller contact S1, coil of relay 189, to line Y. Relay 189 actuates solenoid 190a rotating cam shaft 190b another one-twelfth (1/12) revolution to initiate the operation of the mechanisms which operate during step 2.

Contact S1 opens, deenergizing relay 189 and solenoid 190a, contact S2 closes, contact S13 opens, and contact S14 closes. Opening of contact S13 deenergizes relay 191 which in turn deenergizes solenoid 192a of pilot valve 192, the stem of which remains in position unchanged.

Circuit is established from line X through contact S14, interlock limit switch 208 (closed when piston and rod assembly of mold cylinders 145—146 is in the position shown), back contact of relay 209, and coil of relay 210 to line Y. Relay 210 energizes solenoid 211a of four way valve 211, causing oil to flow from main pressure line 194 through pipe 212 including main throttling valve 213, line 214, parallel lines 215, 216 including throttling valve 217 and slow down valve 218, and cylinder line 219 to head end of mold operating cylinder 146.

Oil discharged from head end of mold operating cylinder 145 due to motion of piston assembly, flows through cylinder line 220, parallel lines 221 and 222 including throttling valve 223 and slow down valve 224, line 230 and four way valve 211, to return main 201.

Slow down valves 218 and 224 are both equipped with by-passing check valves so as to be effective with only one direction of flow. In the motion just described, valve 224 is effective, and oil flows freely through valve 218. At the start of motion, cam 225 holds valve 224 closed, whereby throttling valve 223 limits the flow of oil. As cam 225 rotates and allows valve 224 to open gradually, free flow is established through the latter and the mold operating mechanism accelerates to full speed as controlled by setting of main throttling valve 213.

After somewhat less than 180° of travel, as mold carriages 131 approach closed position, cam 226 depresses roller of valve 224, thus reducing speed of crank shaft rotation as long as cam 226 remains in operative engagement with the valve roller. Cam 226 is so shaped as to allow valve 224 to open as soon as 180° of crank shaft travel has been completed.

The result is a gradual squeezing action of the glass between molds 132, followed by a quick opening of the molds. As 360° rotation is approached cam 225 again closes valve 224 reducing speed of crank shaft rotation, so that the final stop at the end of cylinder stroke may occur without excessive shock.

Slightly before completion of stroke of pistons in cylinders 145, 146, limit switch 227 is momentarily closed, and then allowed to reopen. A circuit is thus established from line X, through limit switch 227, sequence control contact S2 and coil of relay 189 to line Y. Relay 189 actuates solenoid 190a, advancing sequence controller 190 another one-twelfth (1/12) revolution so that S2 opens, S3 closes, S14 opens, S15 closes and S16 closes for initiating the operations occurring during step 3.

Before explaining the operations of step 3 certain special features of the bending mold control should be explained. These relate to the functions of cam shaft 228, the limit switches actuated by it, relays 209, 210, and valves 217, 218, 223 and 224.

The arrangement of these parts is necessary because pistons in cylinders 145, 146 move in one direction during one cycle and in the reverse direction during the following cycle. Had the pistons in said cylinders been in the opposite position and moving in the opposite direction durng the step just described limit switch 229 instead of limit switch 208 would have been closed, and a circuit would have been established through back contact of relay 210 and coil of relay 209 to line Y.

Relay 209 would actuate solenoid 211b of four way valve 211 causing flow of oil and motion of the piston assembly in the reverse direction. Slow down valve 218 and throttling valve 217 are now effective. Cams 231, 232 actuate valve 218 and valve 217 controls the slow speed in this direction. Limit switch 233 takes the place of limit switch 227. Cam shaft 228 is geared to one of the crank shafts 139 so as to rotate less than 360° while the crank shaft 139 rotates through 360°.

Shortly after mold crank shaft 139 commences to rotate during step 2, limit switch 208 opens, deenergizing relay 210 and thus deenergizing solenoid 211a of valve 211. The valve plunger however remains in position unchanged.

Now proceeding with the operations during step 3, the opening of contact S2 deenergizes relay 189 and consequently solenoids 190a. Circuit is established from line X through contact S15 and coil of relay 234 to line Y. Relay 234 energizes solenoid 235a of four way pilot valve 235 which actuates main four way valve 236 in such direction as to cause oil to flow through line 237 to rod end of air blast equipment cylinder 162.

Movement of piston in cylinder 162 discharges oil from head end of cylinder through line 238, main valve 236, line 239, parallel lines 240, 241 including throttling valve 242 and slow down valve 243, and common return line 200 to return main 201.

At the beginning of the cylinder stroke, valve 243 is held closed by cam 244 on crank shaft 157, forcing all oil leaving cylinder 162 to pass through throttling valve 242. This valve is adjusted to produce slow motion but as cam 244 allows valve 243 to open gradually the speed increases to a maximum dependent upon setting of main throttling valve 245 and piping resistance. Similarly as crank shaft 157 approaches the end of its 180° rotation, cam 246 closes valve 243 gradually and reduces the speed to such a value as to avoid excess shock at the end of the stroke of the piston in cylinder 162.

Shortly before the completion of 180° rotation of crank shaft 157, cam 247 closes limit switch 248, establishing a circuit from line X through limit switch 248 and blast timer 249 to line Y. Timer 249 is of conventional design and may be a timer such as shown in the publication entitled Industrial Controls—Bulletin T-20; section F, Vernier-set timers, series 2800, type 2803, issued November 15, 1938, by Automatic Temperature Control Co., which includes a timing motor and a mechanically actuated clutch. The circuit just completed starts the timing motor and engages the clutch. The motor continues to run until the expiration of a predetermined period at which time it stops and the clutch disengages allowing certain driven parts to return to starting position.

While the motor runs, a contact is closed which establishes a circuit from line X through coil of relay 250 to line Y. Relay 250 energizes solenoid 251a of four way valve 251 which permits oil to flow from supply line 194 through line 253 to rod end of cylinder 169a. Cylinder 169a is operatively connected to main air valve 169 and causes it to open, supplying air under pressure to the blast heads 149.

The furnace pusher means 13 is also caused to operate during step 3. Closing of contact S16 simultaneously with closing of contact S15, establishes a circuit from line X through S16 and coil of relay 256 to line Y. Relay 256 energizes solenoid 277a of four way pilot valve 257, actuating the latter, and in turn, main pilot operated four way valve 258. Oil is caused to flow from pressure main 194 through valve 258 and pipe 259 to rod end of pusher cylinder 14. Movement of piston in cylinder 14 forces oil out of head end through line 260, valve 258, line 261, parallel lines 262, 263 including throttling valve 264 and slow down valve 265 to return main 201.

As previously described, cylinder 14 actuates the pusher bar 22 through the medium of rack 17, pinion 19, shaft 20, and pusher gear 21. Geared to shaft 20 is cam disk 266 carrying cams 267, 268 arranged to engage the plunger roller of slow down valve 265. At the moment of starting, valve 265 is closed by cam 267 thus forcing all oil discharged from cylinder 14 to pass through throttling valve 264. Valve 264 is adjusted to give the desired slow speed to avoid objectionable shock in starting the pusher and train of carriers 53 propelled thereby.

Rotation of cam 267 allows valve 265 to open gradually, thus causing the pusher speed to increase to a value dependent upon adjustment of main throttling valve 269. Motion proceeds at full speed until cam 268 engages the roller of valve 265. Valve 265 is gradually closed and the speed of pusher is reduced to a suitable rate for avoiding appreciable shock at the end of stroke.

When blast timer 249 stops, relay 250 and solenoid 251a are deenergized, and valve 251 which is equipped with a return spring, returns to its original position. Cylinder 169a operates in reverse direction and causes valve 169 to cut off air to blast heads 149.

Also, when timer 249 stops, an internal connection is established from line X to terminal 249a, which is connected by suitable wiring and interlocking limit switches (not shown) in such a manner as to allow step 8 to take place. Thus, depending upon the setting of timer 249, step 8 will be instituted upon the completion of step 7, or the stopping of the blast timer 249, whichever occurs later. The air blast remains on during part or all of steps 4, 5 and 6.

During step 2, a circuit is established from line X through contact S28 and coil of relay 254 to line Y. Relay 254 energizes solenoid 255a of air valve 255 which actuates cullet pan cylinder 35 and moves the latter into position beneath the bending and blast station. The cullet pan remains in this position during steps 3 to 10 inclusive, and returns during step 11. An interlocking limit switch prevents institution of step 12 (lowering of discharge elevator car) unless cullet pan is in return or out position.

The thrustors of the charging and discharging elevators are not directly operated by the sequence control. One of these thrustors 100a is shown in Fig. 30 together with interlock limit switch 187 whose closing is dependent upon the operation of the thrustor. The thrustor control (not shown) includes a standard motor starter and two limit switches which act in the same manner as start and stop push buttons. In the case of thrustor 100a a normally open limit switch is so installed as to be closed when the discharge elevator car 68a reaches its bottom limit of travel. The starter is energized and causes thrustor 100a to operate, rotating the track member to horizontal or engaging position.

The starter remains energized and the thrustor continues to operate until a normally closed limit switch is opened during step 10 by completion of outward stroke of discharge elevator unloading mechanism 149. The starter contacts then open and thrustor 100a stops, allowing the elevator track to be returned to vertical or non-engaging position through the action of gravity upon rod 94a. Interlock limit switches such as 187 are provided to assure that the track element is in proper position before an elevator stroke can be made.

The foregoing explanation covers steps 1, 2 and 3 of the cycle and shows the general method of sequence control and interlocking. Interlock and positioning contacts S1 to S12 are closed in turn during rotation of cam shaft 190b, and in conjunction with properly located limit switches permits the institution of the corresponding steps of the cycle. A given step is instituted by rotation of the cam shaft so as to close the contact of corresponding number.

Actuating contacts S13 to S28 energize the operating mechanism, as, for instance, through the medium of relay 191, pilot valve 192 and main valve 193 in the case of step 1. Interlock limit switches are associated with the mechanical apparatus in such manner as to require the proper completion of one step before another step can be instituted. Two exceptions to this general rule may be noted: (1) failure of cullet pan to move to in position does not prevent institution of step 3, and (2) failure of main air valve 169 to be opened or closed at the proper time does not interrupt the cycle. In neither of these cases would failure result in mechanical interferences. As previously stated, all hydraulic cylinders associated with the glass handling apparatus are equipped with cam operating slow down valves in order to impart smooth acceleration and avoid objectionable shocks at the start and finish of the cylinder strokes.

At the completion of step 12, the control is ready for repetition of step 1, but the circuit through coil of relay 189 for the purpose of rotating the sequence controller 190 is not completed until contact is made by cycle start timer 185 or push button 184. Should timer 185 be set for an interval shorter than that necessary for the completion of the cycle, or should some motion fail to be completed for any cause such as maladjustment, excessive friction or the like, all operations stop until the trouble is corrected.

Many of the parts of the improved apparatus which move the carriers from place to place or position them at certain stations are capable of adjustment so that the movement, position or location thereof can be accurately controlled. Moreover, the improved apparatus may be used for making either bent heat treated glass or heat treated glass without being bent. If plane heat treated glass is made, the operation of the molds is omitted and the blast heads are formed to conform to the plane shape of the glass.

Accordingly, the improved apparatus satisfies each and all of the objects set forth in the preamble of this specification and which for brevity are not repeated here; and ultimately provides substantially continuously and automatically operating glass handling and heat treating apparatus for rapidly handling glass safely in carrying out a heat treating cycle in the manufacture of plane or bent heat treated glass.

In the foregoing description, certain terms have been used for brevity, clearness and understanding, but no unnecessary limitations are to be implied therefrom beyond the requirements of the prior art; because such words in being used for descriptive purposes and not for the purpose of limitation, are intended to be broadly construed.

Thus, the word "hydraulic" used herein and in the claims is intended to include preferably oil, but also other liquids which may be used to operate cylinders; the word "air" is intended to include air or other gaseous material used to operate a cylinder; the words "heated treated glass" are intended to include bent heat treated glass or plane heat treated glass; the words "bending" or "molding" are used somewhat synonymously in referring to the means for or operation of forming glass from a flat shape to a non-flat shape; the word "elevator" used alone is intended to refer to either the charging or the discharge elevator or parts thereof; the word "lights" is intended to include the glass material of various forms and shapes being treated; and the word "bent" is intended to include the bending, curving or shaping of glass lights from an initial generally flat form or shape to a desired curved or non-flat form or shape such as a shape that will follow a stream-lined contour.

Moreover, the invention is not limited to the exact structures shown herein, because the sizes of the various parts may be varied to provide other structural embodiments without departing from the scope of the present invention.

Having now described the features of the invention, the construction, manufacture, operation and use of a preferred form of the improved apparatus, and the advantages and results obtained by the use of the same; the new and useful inventions, constructions, devices, combinations, and sub-combinations, and reasonable mechanical equivalents thereof obvious to those skilled in the art, are set forth in the appended claims.

I claim:

1. In glass treating apparatus, a glass carrier, furnace track means for the carrier, elevated external track means for the carrier, elevator means movable between said furnace and external track means for transferring the carrier from one track to the other, track means on said elevator means, support means on the carrier for movably engaging said furnace track means, other support means on the carrier for movably engaging said external track means, said other carrier support means also being adapted to movably engage said elevator track means, and means for moving the elevator means to coincidentally engage said support means with said furnace track means and said other support means with said elevator track means.

2. In glass treating apparatus, a glass carrier, furnace track means for the carrier, elevated external track means for the carrier, elevator means movable between said furnace and external track means for transferring the carrier from one track to the other, track means on said elevator means, support means on the carrier for movably engaging said furnace track means, other support means on the carrier for successively movably engaging said external and elevator track means, said support means being engageable with the furnace track means when said carrier is supported by said other support means on the elevator track means, and means for releasing the elevator means and the track means thereof from the carrier and said other support means when the carrier is at rest after engagement of its said support means with the furnace track means.

3. In glass treating apparatus, a glass carrier, furnace track means for the carrier, elevated external track means for the carrier, elevator means movable between said furnace and external track means for transferring the carrier from one track to the other, track means on said elevator means, support means on the carrier for movably engaging said furnace track means, other support means on the carrier for successively movably engaging said elevator and external track means, and means for engaging the elevator means and the track means thereof with the carrier and said other support means when the carrier is at rest supported by its support means on the furnace track means.

4. In glass treating apparatus, furnace track means, external track means, an elevator car, a track rotatably mounted on the car; a glass carrier adapted to be engaged, supported and moved on said furnace track means, on said external track means, and on said elevator car track; and means for rotating the elevator track to a position unengageable with said carrier.

5. In glass treating apparatus, furnace track means, external track means, an elevator car having a track; a glass carrier adapted to be engaged, supported and moved on said furnace track means, on said external track means, and on said elevator car track; and motor means carried by and movable with said elevator car operatively connected with said elevator track for moving the elevator track with respect to the elevator car to a position unengageable with said carrier.

6. In glass treating apparatus, furnace track means, external track means, an elevator car having a track; a glass carrier adapted to be engaged, supported and moved on said furnace track means, on said external track means, and on said elevator car track; and electro-hydraulic means including an electric motor and hydraulically operated push rod means carried by and movable with said elevator car operatively connected with said elevator track for moving the elevator track with respect to the elevator car to a position unengageable with said carrier.

7. In glass treating apparatus, furnace track means, external track means; a glass carrier adapted to be engaged, supported and moved on said furnace track means and on said external track means; elevator means for transferring the carrier from the external track means to the furnace track means including means for releasing the carrier from the elevator means to the furnace track means, and means carried by the elevator means for operating said release means to release a carrier.

8. In glass treating apparatus, furnace track means including track members, external track means including track members; a glass carrier having members engaging the furnace track means, and having other members engaging said external track means; and elevator means for transferring the carrier from one of said track means to the other including track means like said external track means.

9. In glass treating apparatus, furnace track means including track members, external track means including track members; a glass carrier having members engaging the furnace track means, and having other members engaging said external track means; and elevator means for transferring the carrier from one of said track means to the other including rotatable track means like said external track means.

10. In elevator construction for transferring a carrier between two separate tracks, a car, a track member on the car adapted to be aligned with one of said two separate tracks, means mounting said track member on the car for rotation on its longitudinal axis, and means on the car for rotating said track member.

11. In elevator construction for transferring a carrier between two separate tracks, a car, a track member on the car adapted to be aligned with one of said two separate tracks, means mounting said track member on the car for rotation on its longitudinal axis, and means on the car including a thrustor and a rod operatively connected with the thrustor and track member for rotating said track member.

12. In elevator construction for transferring a carrier between two separate tracks, a car, a track member on the car adapted to be aligned with one of said two separate tracks, means mounting said track member on the car for rotation on its longitudinal axis, a frame structure forming a shaft in which said car is movable between upper and lower limits, guides mounted on said frame at the upper end of said shaft, said car also including slide rods extending upwardly from the car track and slidably mounted in said guides, one of said slide rods being tubular, and means on the car for rotating said track member including a rod operatively connected with the track member and extending through said tubular slide rod.

13. In glass treating apparatus, furnace track means, external track means, elevator means including a car having a track, a glass carrier; support means on the carrier for engaging, supporting and moving the carrier on the furnace track means; a plurality of wheeled supports pivotally mounted on the carrier on axes perpendicular to the wheel axes for engaging, supporting and moving the carrier on the external track means and car track means; and means preventing pivotal movement of the wheeled supports when the carrier is supported by and moved on the furnace track means.

14. In glass treating apparatus, furnace track means, external track means; a glass carrier, means on the carrier for engaging said furnace track means; elevator means for transferring the carrier between the external track means and the furnace track means; said carrier including U-shaped upwardly opening brackets, wheels for engaging the external track means rotatably mounted on the upper ends of the legs of said brackets, and there being an open space between and below said wheels and between the bracket legs; said elevator means including a track member having a central portion about which the member may be rotated and having track rib portions extending in opposite directions from the central portion, said member being adapted when the ribs are located in said open space in a horizontal position to support said wheels, and adapted when the ribs are located in a vertical position to pass between said wheels; and means for rotating the track member between said positions.

15. In a glass treating furnace having a longitudinal slot formed in the roof thereof, external track means, furnace slide track means adjacent said slot, a glass carrier, elevator means for transferring the carrier from the external track means to the furnace track, a wheeled support on said carrier for engagement with said external track means, slide support means on said carrier for sliding on said furnace track over said slot, means for sliding said carrier along said furnace track, and means on the carrier engaging the slot walls for guiding and centering said carrier with respect to said slot as said carrier slides along said furnace track.

16. In a glass treating furnace having a longitudinal slot formed in the roof thereof provided with an enlarged entrance opening at one end of said slot and an enlarged discharge opening at the other end of said slot, a glass carrier adapted for suspending glass in said furnace, furnace track means for the carrier, external track means, elevator means for transferring the carrier between said furnace track means and said external track means with said suspended glass moving through one of said openings during such transfer, and means on the elevator means engaging the furnace for centering said elevator means with respect to said slot and openings.

17. In glass treating apparatus, furnace track means, external track means; a glass carrier for handling glass in a vertical position, means on the carrier for engaging said furnace track means, means on the carrier for engaging said external track means; elevator means for transferring the carrier between the external track means and the furnace track means, said elevator means including a frame structure forming a shaft and a car vertically movable in said shaft, means suspending the car from the upper portion of the frame structure, hydraulic means mounted on said frame structure at the upper portion thereof and operatively connected with the suspending means for raising and lowering the car, and means for retarding the rate of movement of said hydraulic means upon starting and stopping, whereby glass handled on the carrier and car is not injured by jarring and the like.

18. In glass treating apparatus wherein a glass carrier is adapted to be moved through a furnace; elevator means including a shaft and a car moveable in the shaft for removing a carrier vertically upward from the furnace, means for stopping the elevator car and carrier at a bending station within the shaft above the furnace intermediate the limits of travel of the car immediately upon removing the carrier from the furnace; bending means at said bending station within the shaft including opposed bending molds, crank shafts, connecting rods between said crank shafts and bending molds, and means for rotating said crank shafts continuously in one direction through 360 degrees to move the opposed bending molds quickly toward and away from each other; and means actuated by the arrival of the car at the bending station for operating the bending means.

19. In glass treating apparatus wherein a glass carrier is adapted to be moved through a furnace; elevator means including a shaft and a car moveable in the shaft for removing a carrier vertically upward from the furnace, means for stopping the elevator car and carrier at a bending station within the shaft above the furnace intermediate the limits of travel of the car immediately upon removing the carrier from the furnace; bending means at said bending station including opposed bending molds, crank shafts, connecting rods between said crank shafts and bending molds, means for rotating said crank shafts continuously in one direction through 360 degrees to move the opposed bending molds quickly toward and away from each other, and means for reversing the direction of rotation of the crank shafts on each successive operation thereof; and means actuated by the arrival of the car at the bending station for operating the bending means.

20. In glass treating apparatus wherein a glass carrier handling glass in a vertical position is adapted to be moved through a furnace; elevator means including a shaft-forming structure and a car vertically moveable in the shaft for removing a carrier vertically upward from the furnace, means for stopping the elevator car and carrier at a bending and blast station within the shaft above the furnace intermediate the limits of travel of the car immediately upon removing the carrier from the furnace; bending mold mechanism at said station including opposed mold carriages mounted in said structure for horizontal reciprocating movement toward and away from each other within said shaft, and means for reciprocating said mold carriages; blast mechanism at said station including opposed blast heads mounted in said structure for movement toward and away from each other within said shaft, means for moving said blast heads; means actuated by the arrival of the car at the station for successively operating said bending mechanism and said blast mechanism; and guide means at the upper end of said structure mounting the car for movement in the shaft.

21. In glass treating apparatus wherein a glass carrier is adapted to be moved through the furnace; elevator means including a shaft and a car movable in the shaft for removing a carrier vertically upward from the furnace, means for stopping the elevator car and carrier at a blast station within the shaft above the furnace intermediate the limits of travel of the car immediately upon removing the carrier from the furnace, blast means at said station including opposed blade heads, substantially parallel link means mounting said blast heads for movement downwardly inwardly toward and upwardly outwardly away from each other, means for moving said parallelogram link means, and means actuated by the arrival of the car at the bending station for operating said moving means.

22. In glass treating apparatus wherein a glass carrier is adapted to be moved through a furnace; elevator means including a shaft and a car moveable in the shaft for removing a carrier vertically upward from the furnace, means for stopping the elevator car and carrier at a blast station within the shaft above the furnace intermediate the limits of travel of the car immediately upon removing the carrier from the furnace; blast means at said blast station including opposed rotatable blast heads, means mounting said blast heads in said shaft for movement downwardly inwardly toward and upwardly outwardly away from each other, hydraulic means for moving said blast heads, a drive motor mounted on said shaft for rotating the blast heads, driving connections between said drive motor and blast heads moveable with said blast head mounting means, and means actuated by the arrival of the car at the station for operating said hydraulic means.

23. In glass treating apparatus wherein a glass carrier is adapted to be moved through a furnace; elevator means including members forming a shaft and a car moveable in the shaft for removing a carrier vertically upward from the furnace, means for stopping the elevator car and carrier at a blast station within the shaft above the furnace intermediate the limits of travel of the car immediately upon removing the carrier from the furnace, blast mechanism at said station including opposed air blast heads mounted on the members for movement toward and away from each other, hydraulic means for moving said air blast heads; means actuated by the arrival of the car at the station for operating said hydraulic means; and means for supplying air to said air blast heads including a main air valve and hydraulic means for operating said valve.

24. In glass treating apparatus wherein a glass carrier is adapted to be moved through a furnace; elevator means including a shaft and a car moveable in the shaft for removing a carrier vertically upward from the furnace, means for stopping the elevator car and carrier at a bending and blast station within the shaft above the furnace intermediate the limits of travel of the car immediately upon removing the carrier holding a hot glass article from the furnace, hydraulically operated quick acting bending means for bending said hot glass article within the shaft at the station; blast means for cooling the glass article at the station including blast heads and hydraulically operated means for moving the blast heads to and positioning the same at the place alternately occupied by the bending molds while performing the bending operation; and means actuated by the arrival of the car at the station for successively operating the bending and blast means.

25. In elevator construction for transferring a carrier between two separate tracks, upright members forming a vertical elevator shaft structure extending upward over one track and past an end of another track, a car movable within said shaft between upper and lower limits having a track at its lower end movable with respect to the car adapted to be aligned with one of said two separate tracks, and means carried by the upright members above the upper limit of movement of the car track guiding the car for movement in said shaft structure, whereby the elevator shaft is entirely free of guides or other obstructions in the portion thereof traversed by said car track.

26. In elevator construction for transferring a carrier between two separate tracks, upright members forming a vertical elevator shaft structure extending upward over one track and past an end of another track, vertically spaced guide bearings carried by said structure at the upper end of the shaft, a car movable within said shaft having a track at its lower end movable with respect to the car adapted to be aligned with one of said two separate tracks, and said car including slide rods movable within said shaft extending upwardly from the car track and slidably mounted through said guide bearings, whereby the elevator shaft is entirely free of guides or other obstructions in the portion thereof traversed by said car track.

27. In elevator construction for glass treating apparatus, members forming a vertical elevator shaft structure, a furnace discharge elevator car mounted on the structure for movement in the shaft, glass bending molds mounted on the structure for movement in the shaft, glass cooling blast heads mounted on the structure for movement in the shaft, a glass carrier supported on said car; and means for quickly successively moving said car, molds and blast heads to and locating the same at a bending and blast station within the shaft intermediate the limits of the elevator car travel and within the path of movement thereof, including a plurality of hydraulic operating devices carried by the structure and operatively connected respectively to said car, molds and blast heads, and electrical means operatively connected with said hydraulic devices controlling the timing of and sequence of operation of said hydraulic devices to successively move said car, molds and blast heads to said bending and blast station.

28. In a glass treating furnace having a discharge opening; a glass carrier supported over said discharge opening with a glass article suspended therefrom within said furnace; members forming a vertical elevator shaft structure extending upward over said discharge opening, an elevator car mounted on the structure for movement in the shaft between upper and lower limits directly above said discharge opening; means for engaging and supporting said carrier on said car; bending molds mounted on the structure for movement in the shaft; blast heads mounted on the structure for movement in the shaft; means for quickly successively moving said car, molds and blast heads to and accurately locating the same at a bending and blast station within the shaft intermediate the limits of elevator car travel and within the path of movement thereof to bend and cool the glass article carried by the carrier suspended by the car including a plurality of hydraulic operating devices carried by the structure and operatively connected respectively with said car, molds and blast heads, and electrical means operatively connected with said engaging means and hydraulic devices controlling the timing of and sequence of operation of said engaging means and hydraulic devices to successively engage and support the carrier on the car and move said car, molds and blast heads to said bending and blast station.

29. In glass treating apparatus wherein a glass carrier is adapted to be moved through a furnace; elevator means including members forming a shaft and a car movable in the shaft constructed and arranged to remove a carrier vertically upward from the furnace, means for moving the car, means constructed and arranged to stop the car and carrier at a bending station within the shaft above the furnace intermediate the limits of travel of the car immediately upon removing the carrier from the furnace, bending means carried by said members within the shaft and constructed and arranged to move to the bending station for bending glass carried by the carrier immediately upon removal from the furnace, hydraulic means operatively connected with the bending means for moving the bending means to and from the station, and means actuated by the arrival of the car at the bending station for operating the hydraulic means.

30. In glass treating apparatus wherein a glass carrier handling glass in a vertical position is adapted to be moved through a furnace; elevator means including members forming a shaft and a car vertically movable in the shaft constructed and arranged to remove a carrier vertically upward from the furnace within the shaft to a blast station and then further upward to the top of the shaft; means for moving the car; blast mechanism at said blast station including opposed blast heads mounted on said members and constructed and arranged for movement toward and away from each other within said shaft, hydraulically operated means for moving said blast heads; means actuated by the arrival of the car at the blast station for operating said hydraulic means; and guide means at the upper end of said shaft mounting the car for movement in the shaft.

31. In glass treating apparatus wherein a glass carrier is adapted to be moved through a furnace; elevator means including members forming a shaft and a car movable in the shaft constructed and arranged to remove a carrier vertically upward from the furnace, means for moving the car, means constructed and arranged to stop the elevator car and carrier at a bending and blast station within the shaft above the furnace intermediate the limits of travel of the car immediately upon removing the carrier from the furnace, bending means carried by said members within the shaft and constructed and arranged to move to said station for bending glass carried by the carrier immediately upon removal from the furnace, hydraulic means operatively connected with the bending means for moving the bending means to and from the station, blast means carried by said members within the shaft and constructed and arranged to move to the station for blasting bent glass immediately after bending, hydraulic means operatively connected with said blast means for moving the blast means to and from the station, and means actuated by the arrival of the car at the station for successively operating the bending means and blast means.

32. In glass treating apparatus wherein a glass carrier is adapted to be moved through a furnace; elevator means including members forming a shaft and a car movable in the shaft constructed and arranged to remove a carrier vertically upward from the furnace, means for moving the car, means constructed and arranged to stop the elevator car and carrier at a bending station within the shaft above the furnace intermediate the limits of travel of the car immediately upon removing the carrier from the furnace, quick acting bending mold mechanism carried by said members and constructed and arranged to move to said bending station, hydraulic means operatively connected with the bending mechanism for moving the bending mechanism to and from the station, means actuated by the arrival of the car at the station for operating the hydraulic means, and means constructed and arranged to change the operating speed of the hydraulic means during operation thereof for preventing jarring or breakage of glass suspended from the carrier being bent by the bending mold mechanism.

33. In glass treating apparatus wherein a glass carrier is adapted to be moved through a furnace; elevator means including members forming a shaft and a car movable in the shaft constructed and arranged to remove a carrier vertically upward from the furnace, means for moving the car, means constructed and arranged to stop the elevator car and carrier at a blast station within the shaft above the furnace intermediate the limits of travel of the car immediately upon removing the carrier from the furnace, blast mechanism, means mounting the blast mechanism on said members for movement downwardly inwardly to and upwardly outwardly from said blast station, hydraulic means for operating said blast mechanism, means for changing the speed of operation of said hydraulic means as it moves the blast mechanism, and means actuated by the arrival of the car at the station for operating said hydraulic means.

ARTHUR H. VAUGHAN.